United States Patent
Quanci et al.

(10) Patent No.: US 10,968,395 B2
(45) Date of Patent: *Apr. 6, 2021

(54) MULTI-MODAL BEDS OF COKING MATERIAL

(71) Applicant: SUNCOKE TECHNOLOGY AND DEVELOPMENT LLC., Lisle, IL (US)

(72) Inventors: John Francis Quanci, Haddonfield, NJ (US); Syed Ahmed, Aurora, IL (US); Jake Sarpen, Lisle, IL (US); Jonathan Perkins, Lisle, IL (US); Jeff Wozek, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 436 days.

This patent is subject to a terminal disclaimer.

(21) Appl. No.: 14/983,837

(22) Filed: Dec. 30, 2015

(65) Prior Publication Data

US 2016/0186063 A1    Jun. 30, 2016

Related U.S. Application Data

(60) Provisional application No. 62/098,935, filed on Dec. 31, 2014.

(51) Int. Cl.
    *C10B 57/06*    (2006.01)
    *C10L 5/04*     (2006.01)
    (Continued)

(52) U.S. Cl.
    CPC .............. *C10B 57/04* (2013.01); *C10B 57/06* (2013.01); *C10L 5/04* (2013.01); *C10L 5/36* (2013.01); *C10L 5/366* (2013.01)

(58) Field of Classification Search
    CPC ....... C10B 57/04; C10B 57/045; C10B 57/06; C10B 15/02; C10B 31/08; C10L 5/04; C10L 5/366
    See application file for complete search history.

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

Metallurgical Coke MSDS, ArcelorMittal, May 30, 2011, available online at: http://dofasco.arcelormittal.com/~/media/Files/A/Arcelormittal-Canada/material-safety/metallurgical-coke.pdf.*

(Continued)

*Primary Examiner* — Jonathan Luke Pilcher
(74) *Attorney, Agent, or Firm* — Perkins Coie LLP

(57) ABSTRACT

The present technology is generally directed to providing beds of coking material to charge a coking oven. In various embodiments, a quantity of first particulate material, having a first particulate size and bulk density, is combined with a second particulate material, having a second particulate size and bulk density, to define a multi-modal bed of coking material. The multi-modal bed of coking material exhibits an optimized bulk density that is greater than an ideal bulk density predicted by a linear combination of the bulk densities of the individual materials.

20 Claims, 21 Drawing Sheets

(51) Int. Cl.
*C10L 5/36* (2006.01)
*C10B 57/04* (2006.01)

(56) References Cited

U.S. PATENT DOCUMENTS

| | | |
|---|---|---|
| 845,719 A | 2/1907 | Schniewind |
| 976,580 A | 7/1909 | Krause |
| 1,140,798 A | 5/1915 | Carpenter |
| 1,424,777 A | 8/1922 | Schondeling |
| 1,430,027 A | 9/1922 | Plantinga |
| 1,486,401 A | 3/1924 | Van Ackeren |
| 1,530,995 A | 3/1925 | Geiger |
| 1,572,391 A | 2/1926 | Kiaiber |
| 1,677,973 A | 7/1928 | Marquard |
| 1,705,039 A | 3/1929 | Thornhill |
| 1,721,813 A | 7/1929 | Geipert |
| 1,757,682 A | 5/1930 | Palm |
| 1,818,370 A | 8/1931 | Wine |
| 1,818,994 A | 8/1931 | Kreisinger |
| 1,830,951 A | 11/1931 | Lovett |
| 1,848,818 A | 3/1932 | Becker |
| 1,947,499 A | 2/1934 | Schrader et al. |
| 1,955,962 A | 4/1934 | Jones |
| 2,075,337 A | 3/1937 | Burnaugh |
| 2,141,035 A | 12/1938 | Daniels |
| 2,195,466 A | 4/1940 | Otto |
| 2,235,970 A | 3/1941 | Wilputte |
| 2,340,981 A | 2/1944 | Otto |
| 2,394,173 A | 2/1946 | Harris et al. |
| 2,424,012 A | 7/1947 | Bangham et al. |
| 2,641,575 A | 6/1953 | Otto |
| 2,649,978 A | 8/1953 | Such |
| 2,667,185 A | 1/1954 | Beavers |
| 2,723,725 A | 11/1955 | Keifer |
| 2,756,842 A | 7/1956 | Chamberlin et al. |
| 2,813,708 A | 11/1957 | Frey |
| 2,827,424 A | 3/1958 | Homan |
| 2,873,816 A | 2/1959 | Umbricht et al. |
| 2,902,991 A | 9/1959 | Whitman |
| 2,907,698 A * | 10/1959 | Erich Schulz .......... C10B 57/04 201/19 |
| 3,015,893 A | 1/1962 | McCreary |
| 3,033,764 A | 5/1962 | Hannes |
| 3,224,805 A | 12/1965 | Clyatt |
| 3,448,012 A | 6/1969 | Allred |
| 3,462,345 A | 8/1969 | Kernan |
| 3,511,030 A | 5/1970 | Hall et al. |
| 3,542,650 A | 11/1970 | Kulakov |
| 3,545,470 A | 12/1970 | Paton |
| 3,592,742 A | 7/1971 | Thompson |
| 3,616,408 A | 10/1971 | Hickam |
| 3,623,511 A | 11/1971 | Levin |
| 3,630,852 A | 12/1971 | Nashan et al. |
| 3,652,403 A | 3/1972 | Knappstein et al. |
| 3,676,305 A | 7/1972 | Cremer |
| 3,709,794 A | 1/1973 | Kinzler et al. |
| 3,710,551 A | 1/1973 | Sved |
| 3,746,626 A | 7/1973 | Morrison, Jr. |
| 3,748,235 A | 7/1973 | Pries |
| 3,784,034 A | 1/1974 | Thompson |
| 3,806,032 A | 4/1974 | Pries |
| 3,811,572 A | 5/1974 | Tatterson |
| 3,836,161 A | 9/1974 | Buhl |
| 3,839,156 A | 10/1974 | Jakobi et al. |
| 3,844,900 A | 10/1974 | Schulte |
| 3,857,758 A | 12/1974 | Mole |
| 3,875,016 A | 4/1975 | Schmidt-Balve et al. |
| 3,876,143 A | 4/1975 | Rossow et al. |
| 3,876,506 A | 4/1975 | Dix et al. |
| 3,878,053 A | 4/1975 | Hyde |
| 3,894,302 A | 7/1975 | Lasater |
| 3,897,312 A | 7/1975 | Armour et al. |
| 3,906,992 A | 9/1975 | Leach |
| 3,912,091 A | 10/1975 | Thompson |
| 3,912,597 A | 10/1975 | MacDonald |
| 3,917,458 A | 11/1975 | Polak |
| 3,928,144 A | 12/1975 | Jakimowicz |
| 3,930,961 A | 1/1976 | Sustarsic et al. |
| 3,933,443 A * | 1/1976 | Lohrmann .............. C10B 57/04 44/503 |
| 3,957,591 A | 5/1976 | Riecker |
| 3,959,084 A | 5/1976 | Price |
| 3,963,582 A | 6/1976 | Helm et al. |
| 3,969,191 A | 7/1976 | Bollenbach |
| 3,975,148 A | 8/1976 | Fukuda et al. |
| 3,984,289 A | 10/1976 | Sustarsic et al. |
| 4,004,702 A | 1/1977 | Szendroi |
| 4,004,983 A | 1/1977 | Pries |
| 4,025,395 A | 5/1977 | Ekholm et al. |
| 4,040,910 A | 8/1977 | Knappstein et al. |
| 4,045,056 A | 8/1977 | Kandakov et al. |
| 4,045,299 A | 8/1977 | MacDonald |
| 4,059,885 A | 11/1977 | Oldengott |
| 4,067,462 A | 1/1978 | Thompson |
| 4,083,753 A | 4/1978 | Rogers et al. |
| 4,086,231 A | 4/1978 | Ikio |
| 4,093,245 A | 6/1978 | Connor |
| 4,100,033 A | 7/1978 | Holter |
| 4,100,491 A | 7/1978 | Newman, Jr. et al. |
| 4,111,757 A | 9/1978 | Ciarimboli |
| 4,124,450 A | 11/1978 | MacDonald |
| 4,135,948 A | 1/1979 | Mertens et al. |
| 4,141,796 A | 2/1979 | Clark et al. |
| 4,145,195 A | 3/1979 | Knappstein et al. |
| 4,147,230 A | 4/1979 | Ormond et al. |
| 4,162,546 A | 7/1979 | Shortell |
| 4,181,459 A | 1/1980 | Price |
| 4,189,272 A | 2/1980 | Gregor et al. |
| 4,194,951 A | 3/1980 | Pries |
| 4,196,053 A | 4/1980 | Grohmann |
| 4,211,608 A | 7/1980 | Kwasnoski et al. |
| 4,211,611 A | 7/1980 | Bocsanczy et al. |
| 4,213,489 A | 7/1980 | Cain |
| 4,213,828 A | 7/1980 | Calderon |
| 4,222,748 A | 9/1980 | Argo et al. |
| 4,222,824 A | 9/1980 | Flockenhaus et al. |
| 4,224,109 A | 9/1980 | Flockenhaus |
| 4,225,393 A | 9/1980 | Gregor et al. |
| 4,235,830 A | 11/1980 | Bennett et al. |
| 4,239,602 A | 12/1980 | La Bate |
| 4,248,671 A | 2/1981 | Belding |
| 4,249,997 A | 2/1981 | Schmitz |
| 4,263,099 A | 4/1981 | Porter |
| 4,268,360 A | 5/1981 | Tsuzuki et al. |
| 4,271,814 A | 6/1981 | Lister |
| 4,284,478 A | 8/1981 | Brommel |
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,324,568 A | 4/1982 | Wilcox et al. |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A | 2/1983 | Mertens et al. |
| 4,375,388 A | 3/1983 | Hara et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |

(56) References Cited

U.S. PATENT DOCUMENTS

| | | |
|---|---|---|
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Wirtschafter |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,793,931 A | 12/1988 | Doyle et al. |
| 4,824,614 A | 4/1989 | Jones |
| 4,889,698 A | 12/1989 | Moller et al. |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Mull, Jr. et al. |
| 5,715,962 A | 2/1998 | McDonnell |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,596,128 B2 | 7/2003 | Westbrook |
| 6,626,984 B1 | 9/2003 | Taylor |
| 6,699,035 B2 | 3/2004 | Brooker |
| 6,758,875 B2 | 7/2004 | Reid et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello et al. |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges |
| 7,823,401 B2 | 11/2010 | Takeuchi et al. |
| 7,827,689 B2 | 11/2010 | Crane et al. |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,236,142 B2 | 8/2012 | Westbrook |
| 8,266,853 B2 | 9/2012 | Bloom et al. |
| 8,398,935 B2 | 3/2013 | Howell, Jr. et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,404,043 B2 | 8/2016 | Kim |
| 9,498,786 B2 | 11/2016 | Pearson |
| 10,047,295 B2 | 8/2018 | Chun et al. |
| 10,323,192 B2 | 6/2019 | Quanci et al. |
| 10,578,521 B1 | 3/2020 | Dinakaran et al. |
| 10,732,621 B2 | 8/2020 | Cella et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2005/0087767 A1 | 4/2005 | Fitzgerald et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0169578 A1 | 7/2008 | Crane et al. |
| 2008/0179165 A1 | 7/2008 | Chen et al. |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0095521 A1 | 4/2010 | Bertini et al. |
| 2010/0106310 A1 | 4/2010 | Grohman |
| 2010/0113266 A1 | 5/2010 | Abe et al. |
| 2010/0115912 A1 | 5/2010 | Worley |

(56) References Cited

U.S. PATENT DOCUMENTS

| | | |
|---|---|---|
| 2010/0119425 A1 | 5/2010 | Palmer |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Al-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0048402 A1 | 2/2014 | Quanci et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0183024 A1 | 7/2014 | Chun et al. |
| 2014/0183026 A1 | 7/2014 | Quanci et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0175433 A1 | 6/2015 | Micka et al. |
| 2015/0219530 A1 | 8/2015 | Li et al. |
| 2015/0247092 A1 | 9/2015 | Quanci et al. |
| 2015/0287026 A1 | 10/2015 | Yang et al. |
| 2015/0328576 A1 | 11/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0032193 A1 | 2/2016 | Sarpen et al. |
| 2016/0048139 A1 | 2/2016 | Samples et al. |
| 2016/0060532 A1 | 3/2016 | Quanci et al. |
| 2016/0060533 A1 | 3/2016 | Quanci et al. |
| 2016/0060534 A1 | 3/2016 | Quanci et al. |
| 2016/0060536 A1 | 3/2016 | Quanci et al. |
| 2016/0149944 A1 | 5/2016 | Obermeier et al. |
| 2016/0154171 A1 | 6/2016 | Kato et al. |
| 2016/0186064 A1* | 6/2016 | Quanci .................. C10B 57/06 201/8 |
| 2016/0186065 A1* | 6/2016 | Quanci .................. C10B 57/06 201/20 |
| 2017/0015908 A1 | 1/2017 | Quanci et al. |
| 2017/0182447 A1 | 6/2017 | Sappok et al. |
| 2017/0261417 A1 | 9/2017 | Zhang |
| 2019/0317167 A1 | 10/2019 | LaBorde et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |

FOREIGN PATENT DOCUMENTS

| | | |
|---|---|---|
| CA | 2822841 | 7/2012 |
| CA | 2822857 | 7/2012 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 1358822 A | 7/2002 |
| CN | 2509188 Y | 9/2002 |
| CN | 2521473 Y | 11/2002 |
| CN | 2528771 Y | 1/2003 |
| CN | 1468364 A | 1/2004 |
| CN | 1527872 A | 9/2004 |
| CN | 2668641 Y | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 102155300 A | 8/2011 |
| CN | 202226816 U | 5/2012 |
| CN | 202265541 U | 6/2012 |
| CN | 102584294 A | 7/2012 |
| CN | 202415446 U | 9/2012 |
| CN | 103468289 A | 12/2013 |
| CN | 203981700 U | 12/2014 |
| CN | 105189704 A | 12/2015 |
| CN | 106661456 A | 5/2017 |
| CN | 107445633 A | 12/2017 |
| CN | 100500619 C | 6/2020 |
| DE | 201729 C | 9/1908 |
| DE | 212176 C | 7/1909 |
| DE | 1212037 B | 3/1966 |
| DE | 3315738 A1 | 11/1983 |
| DE | 3231697 C1 | 1/1984 |
| DE | 3329367 C1 | 11/1984 |
| DE | 3328702 A1 | 2/1985 |
| DE | 3407487 C1 | 6/1985 |
| DE | 19545736 A1 | 6/1997 |
| DE | 19803455 C1 | 8/1999 |
| DE | 10122531 A1 | 11/2002 |
| DE | 10154785 A1 | 5/2003 |
| DE | 102005015301 | 10/2006 |
| DE | 102006004669 | 8/2007 |
| DE | 102006026521 A1 | 12/2007 |
| DE | 102009031436 A1 | 1/2011 |
| DE | 102011052785 B3 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 A1 | 8/1977 |
| GB | 364236 A | 1/1932 |
| GB | 368649 A | 3/1932 |
| GB | 441784 A | 1/1936 |
| GB | 606340 A | 8/1948 |
| GB | 611524 A | 11/1948 |
| GB | 725865 A | 3/1955 |
| GB | 871094 A | 6/1961 |
| GB | 923205 A | 5/1963 |

(56) References Cited

FOREIGN PATENT DOCUMENTS

| | | |
|---|---|---|
| JP | S50148405 | 11/1975 |
| JP | S59019301 | 2/1978 |
| JP | 54054101 A | 4/1979 |
| JP | S5453103 A | 4/1979 |
| JP | 57051786 A | 3/1982 |
| JP | 57051787 A | 3/1982 |
| JP | 57083585 A | 5/1982 |
| JP | 57090092 A | 6/1982 |
| JP | S57172978 A | 10/1982 |
| JP | 58091788 A | 5/1983 |
| JP | 59051978 A | 3/1984 |
| JP | 59053589 A | 3/1984 |
| JP | 59071388 A | 4/1984 |
| JP | 59108083 A | 6/1984 |
| JP | 59145281 A | 8/1984 |
| JP | 60004588 A | 1/1985 |
| JP | 61106690 A | 5/1986 |
| JP | 62011794 A | 1/1987 |
| JP | 62285980 | 12/1987 |
| JP | 01103694 A | 4/1989 |
| JP | 01249886 A | 10/1989 |
| JP | H0319127 | 3/1991 |
| JP | H04178494 A | 6/1992 |
| JP | H05230466 A | 9/1993 |
| JP | H0649450 A | 2/1994 |
| JP | H0654753 U | 7/1994 |
| JP | 06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 A | 5/1996 |
| JP | H10273672 A | 10/1998 |
| JP | H11-131074 | 5/1999 |
| JP | 2000204373 A | 7/2000 |
| JP | 2000219883 A | 8/2000 |
| JP | 2001055576 A | 2/2001 |
| JP | 2001200258 A | 7/2001 |
| JP | 03197588 B2 | 8/2001 |
| JP | 2002097472 A | 4/2002 |
| JP | 2002106941 A | 4/2002 |
| JP | 2003041258 A | 2/2003 |
| JP | 2003071313 A | 3/2003 |
| JP | 2003292968 A | 10/2003 |
| JP | 2003342581 A | 12/2003 |
| JP | 2005503448 A | 2/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 04159392 B2 | 10/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009144121 A | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 A | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 20030012458 A | 2/2003 |
| KR | 1020050053861 | 6/2005 |
| KR | 20060132336 A | 12/2006 |
| KR | 100737393 B1 | 7/2007 |
| KR | 10-0797852 B1 | 1/2008 |
| KR | 20080069170 A | 7/2008 |
| KR | 10-2011-0010452 A | 2/2011 |
| KR | 101314288 | 4/2011 |
| KR | 10-0296700 B1 | 10/2011 |
| KR | 20120033091 A | 4/2012 |
| KR | 20130050807 | 5/2013 |
| KR | 101318388 B1 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A | 10/2012 |
| TW | 201245431 A1 | 11/2012 |
| UA | 50580 | 10/2002 |
| WO | WO-9012074 A1 | 10/1990 |
| WO | WO-9945083 A1 | 9/1999 |
| WO | WO02062922 | 8/2002 |
| WO | WO2005023649 | 3/2005 |
| WO | WO-2005115583 A1 | 12/2005 |
| WO | WO-2007103649 A2 | 9/2007 |
| WO | WO-2008034424 A1 | 3/2008 |
| WO | WO-2010107513 A1 | 9/2010 |
| WO | WO-2011000447 A1 | 1/2011 |
| WO | WO2011126043 | 10/2011 |
| WO | WO-2012029979 A1 | 3/2012 |
| WO | WO2012031726 | 3/2012 |
| WO | WO-2013023872 A1 | 2/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |

OTHER PUBLICATIONS

U.S. Appl. No. 15/614,525, filed Jun. 5, 2017, Quanci et al.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
"Middletown Coke Company HRSG Maintenance BACT Analysis Option 1 -Individual Spray Quenches Sun Heat Recovery Coke Facility Process Flow Diagram Middletown Coke Company 100 Oven Case #1 -24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Walker D N et al, "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
U.S. Appl. No. 15/392,942, filed Dec. 28, 2016, Quanci et al.
U.S. Appl. No. 14/952,267, filed Nov. 25, 2015, Quanci et al.
U.S. Appl. No. 14/959,450, filed Dec. 4, 2015, Quanci et al.
U.S. Appl. No. 14/984,489, filed Dec. 30, 2015, Quanci et al.
U.S. Appl. No. 14/986,281, filed Dec. 31, 2015, Quanci et al.
U.S. Appl. No. 14/987,625, filed Jan. 4, 2016, Quanci et al.
U.S. Appl. No. 15/014,547, filed Feb. 3, 2016, Choi et al.

(56) References Cited

OTHER PUBLICATIONS

ASTM D5341-99(2010)e1, Standard Test Method for Measuring Coke Reactivity Index (CRI) and Coke Strength After Reaction (CSR), ASTM International, West Conshohocken, PA, 2010.
Basset, et al., "Calculation of steady flow pressure loss coefficients for pipe junctions," Proc Instn Mech Engrs., vol. 215, Part C. IMechIE 2001.
Clean coke process: process development studies by USS Engineers and Consultants, Inc., Wisconsin Tech Search, request date Oct. 5, 2011, 17 pages.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
JP 03-197588, Inoqu Keizo et al., Method and Equipment for Boring Degassing Hole in Coal Charge in Coke Oven, Japanese Patent (Abstract Only) Aug. 28, 1991.
JP 04-159392, Inoue Keizo et al., Method and Equipment for Opening Hole for Degassing of Coal Charge in Coke Oven, Japanese Patent (Abstract Only) Jun. 2, 1992.
Rose, Harold J., "The Selection of Coals for the Manufacture of Coke," American Institute of Mining and Metallurgical Engineers, Feb. 1926, 8 pages.
U.S. Appl. No. 15/322,176, filed Dec. 27, 2016, West et al.
U.S. Appl. No. 15/443,246, filed Feb. 27, 2017, Quanci et al.
U.S. Appl. No. 15/511,036, filed Mar. 14, 2017, West et al.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
U.S. Appl. No. 15/139,568, filed Apr. 27, 2016, Quanci et al.
Waddell, et al., "Heat-Recovery Cokemaking Presentation," Jan. 1999, pp. 1-25.
Westbrook, "Heat-Recovery Cokemaking at Sun Coke," AISE Steel Technology, Pittsburg, PA, vol. 76, No. 1, Jan. 1999, pp. 25-28.
Yu et al., "Coke Oven Production Technology," Lianoning Science and Technology Press, first edition, Apr. 2014, pp. 356-358.
"Resources and Utilization of Coking Coal in China," Mingxin Shen ed., Chemical Industry Press, first edition, Jan. 2007, pp. 242-243, 247.
International Search Report and Written Opinion issued in PCT/US2015/068117, dated Apr. 18, 2016, 17 pages.
Internatinoal Search Report and Written Opinion issued in PCT/US2015/068111, dated Apr. 18, 2016, 12 pages.
International Search Report and Written Opinion issued in PCT/US2015/068314, dated Apr. 18, 2016, 12 pages.
Bloom, et al., "Modular cast block—The future of coke oven repairs," Iron & Steel Technol, AIST, Warrendale, PA, vol. 4, No. 3, Mar. 1, 2007, pp. 61-64.
U.S. Appl. No. 16/026,363, filed Jul. 3, 2018, Chun et al.
U.S. Appl. No. 16/047,198, filed Jul. 27, 2018, Quanci et al.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Industrial Furnace Design Handbook, Editor-in-Chief: First Design Institute of First Ministry of Machinery Industry, Beijing: Mechanical Industry Press, pp. 180-183, Oct. 1981.

"What is dead-band control," forum post by user "wireaddict" on AllAboutCircuits.com message board, Feb. 8, 2007, accessed Oct. 24, 2018 at https:/forum.allaboutcircuits.com/threads/what-is-dead-band-control.4728/; 8 pages.
U.S. Appl. No. 15/987,860, filed May 23, 2018, Crum et al.
U.S. Appl. No. 16/000,516, filed Jun. 5, 2018, Quanci.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference-2/ditigal-video.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Madias, et al., "A review on stamped charging of coals" (2013). Available at https://www.researchgate.net/publication/263887759_A_review_on_stamped_charging_of_coals.
U.S. Appl. No. 16/251,352, filed Jan. 18, 2019, Quanci et al.
U.S. Appl. No. 16/428,014, filed May 31, 2019, Quanci et al.
U.S. Appl. No. 16/704,689, filed Dec. 5, 2019, West et al.
U.S. Appl. No. 16/729,036, filed Dec. 27, 2019, Quanci et at.
U.S. Appl. No. 16/729,053, filed Dec. 27, 2019, Quanci et at.
U.S. Appl. No. 16/729,057, filed Dec. 27, 2019, Quanci et at.
U.S. Appl. No. 16/729,068, filed Dec. 27, 2019, Quanci et at.
U.S. Appl. No. 16/729,122, filed Dec. 27, 2019, Quanci et at.
U.S. Appl. No. 16/729,129, filed Dec. 27, 2019, Quanci et at.
U.S. Appl. No. 16/729,157, filed Dec. 27, 2019, Quanci et at.
U.S. Appl. No. 16/729,170, filed Dec. 27, 2019, Quanci et at.
U.S. Appl. No. 16/729,201, filed Dec. 27, 2019, Quanci et at.
U.S. Appl. No. 16/729,212, filed Dec. 27, 2019, Quanci et at.
U.S. Appl. No. 16/729,219, filed Dec. 27, 2019, Quanci et at.
U.S. Appl. No. 16/735,103, filed Jan. 6, 2020, Quanci et al.
Joseph, B., "A tutorial on inferential control and its applications," Proceedings of the 1999 American Control Conference, San Diego, CA, 1999, pp. 3106-3118 vol. 5.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Brazilian Preliminary Office Action for Brazilian Application No. BR112017014233-3; dated Oct. 15, 2019; 8 pages.
Brazilian Preliminary Office Action for Brazilian Application No. BR1120170141973; dated Oct. 15, 2019; 8 pages.
Brazilian Preliminary Office Action for Brazilian Application No. BR112017014186-8; dated Dec. 20, 2019; 7 pages.
Chinese Office Action in Chinese Application No. 201580077229.8; dated Sep. 9, 2019; 24 pages.
India First Examination Report in Application No. 201737026986; dated Sep. 27, 2019; 7 pages.
India First Examination Report in Application No. 201737026985; dated Nov. 26, 2019; 9 pages.
India First Examination Report in Application No. 201737026982; dated Dec. 14, 2019; 7 pages.
U.S. Appl. No. 15/322,176, filed Dec. 27, 2016, titled Horizontal Heat Recovery Coke Ovens Having Monolith Crowns.
U.S. Appl. No. 15/392,942, filed Dec. 28, 2016, titled Method and System For Dynamically Charging a Coke Oven.
U.S. Appl. No. 14/655,204, filed Jun. 24, 2015, titled Systems and Methods For Removing Mercury From Emissions.
U.S. Appl. No. 16/047,198, filed Jul. 27, 2018, titled Coke Plant Including Exhaust Gas Sharing.
U.S. Appl. No. 14/587,670, filed Dec. 31, 2014, titled Methods For Decarbonizing Coking Ovens, and Associated Systems and Devices.
U.S. Appl. No. 15/987,860, filed May 23, 2018, titled System and Method For Repairing a Coke Oven.
U.S. Appl. No. 16/828,448, filed Mar. 24, 2020, Quanci et al.
U.S. Appl. No. 16/845,530, filed Apr. 101, 2020, Quanci et al.
U.S. Appl. No. 16/897,957, filed Jun. 10, 2020, Ball et al.
U.S. Appl. No. 17/076,563, filed Oct. 21, 2020, Crum et al.
Brazilian Examination Report for Brazilian Application No. BR112017014186-8; dated Jul. 21, 2020; 27 pages.
Brazilian Examination Report for Brazilian Application No. BR112017014233-3; dated Jul. 21, 2020; 19 pages.

(56) References Cited

OTHER PUBLICATIONS

Brazilian Examination Report for Brazilian Application No. BR112017014197-3; dated Jul. 21, 2020; 24 pages.
U.S. Appl. No. 07/587,742, filed Sep. 25, 1990, now U.S. Pat. No. 5,114,542, titled Nonrecovery Coke Oven Battery and Method of Operation.
U.S. Appl. No. 07/878,904, filed May 6, 1992, now U.S. Pat. No. 5,318,671, titled Method of Operation of Nonrecovery Coke Oven Battery.
U.S. Appl. No. 09/783,195, filed Feb. 14, 2001, now U.S. Pat. No. 6,596,128, titled Coke Oven Flue Gas Sharing.
U.S. Appl. No. 07/886,804, filed May 22, 1992, now U.S. Pat. No. 5,228,955, titled High Strength Coke Oven Wall Having Gas Flues Therein.
U.S. Appl. No. 08/059,673, filed May 12, 1993, now U.S. Pat. No. 5,447,606, titled Method of and Apparatus For Capturing Coke Oven Charging Emissions.
U.S. Appl. No. 08/914,140, filed Aug. 19, 1997, now U.S. Pat. No. 5,928,476, titled Nonrecovery Coke Oven Door.
U.S. Appl. No. 09/680,187, filed Oct. 5, 2000, now U.S. Pat. No. 6,290,494, titled Method and Apparatus For Coal Coking.
U.S. Appl. No. 10/933,866, filed Sep. 3, 2004, now U.S. Pat. No. 7,331,298, titled Coke Oven Rotary Wedge Door Latch.
U.S. Appl. No. 11/424,566, filed Jun. 16, 2006, now U.S. Pat. No. 7,497,930, titled Method and Apparatus For Compacting Coal For a Coal Coking Process.
U.S. Appl. No. 12/405,269, filed Mar. 17, 2009, now U.S. Pat. No. 7,998,316, titled Flat Push Coke Wet Quenching Apparatus and Process.
U.S. Appl. No. 13/205,960, filed Aug. 9, 2011, now U.S. Pat. No. 9,321,965, titled Flat Push Coke Wet Quenching Apparatus and Process.
U.S. Appl. No. 11/367,236, filed Mar. 3, 2006, now U.S. Pat. No. 8,152,970, titled Method and Apparatus For Producing Coke.
U.S. Appl. No. 12/403,391, filed Mar. 13, 2009, now U.S. Pat. No. 8,172,930, titled Cleanable In Situ Spark Arrestor.
U.S. Appl. No. 12/849,192, filed Aug. 3, 2010, now U.S. Pat. No. 9,200,225, titled Method and Apparatus For Compacting Coal For a Coal Coking Process.
U.S. Appl. No. 13/631,215, filed Sep. 28, 2012, now U.S. Pat. No. 9,683,740, titled Methods For Handling Coal Processing Emissions and Associated Systems and Devices.
U.S. Appl. No. 13/730,692, filed Dec. 28, 2012, now U.S. Pat. No. 9,193,913, titled Reduced Output Rate Coke Oven Operation With Gas Sharing Providing Extended Process Cycle.
U.S. Appl. No. 14/921,723, filed Oct. 23, 2015, titled Reduced Output Rate Coke Oven Operation With Gas Sharing Providing Extended Process Cycle.
U.S. Appl. No. 14/655,204, now U.S. Pat. No. 10,016,714, filed Jun. 24, 2015, titled Systems and Methods For Removing Mercury From Emissions.
U.S. Appl. No. 16/000,516, filed Jun. 5, 2018, titled Systems and Methods For Removing Mercury From Emissions.
U.S. Appl. No. 13/830,971, filed Mar. 14, 2013, now U.S. Pat. No. 10,047,296, titled Non-Perpendicular Connections Between Coke Oven Uptakes and a Hot Common Tunnel, and Associated Systems and Methods, now U.S. Pat. No. 10,047,295.
U.S. Appl. No. 16/026,363, filed Jul. 3, 2018, titled Non-Perpendicular Connections Between Coke Oven Uptakes and a Hot Common Tunnel, and Associated Systems and Methods.
U.S. Appl. No. 13/730,796, filed Dec. 28, 2012, titled Methods and Systems For Improved Coke Quenching.
U.S. Appl. No. 13/730,598, filed Dec. 28, 2012, now U.S. Pat. No. 9,238,778, titled Systems and Methods For Improving Quenched Coke Recovery.
U.S. Appl. No. 14/952,267, filed Nov. 25, 2015, now U.S. Pat. No. 9,862,888, titled Systems and Methods For Improving Quenched Coke Recovery.

U.S. Appl. No. 15/830,320, filed Dec. 4, 2017, now U.S. Pat. No. 10,323,192, titled Systems and Methods For Improving Quenched Coke Recovery.
U.S. Appl. No. 13/730,735, filed Dec. 28, 2012, now U.S. Pat. No. 9,273,249, titled Systems and Methods For Controlling Air Distribution in a Coke Oven.
U.S. Appl. No. 14/655,013, filed Jun. 23, 2015, titled Vent Stack Lids and Associated Systems and Methods.
U.S. Appl. No. 13/843,166, now U.S. Pat. No. 9,273,250, filed Mar. 15, 2013, titled Methods and Systems For Improved Quench Tower Design.
U.S. Appl. No. 15/014,547, filed Feb. 3, 2016, titled Methods and Systems For Improved Quench Tower Design.
U.S. Appl. No. 14/655,003, filed Jun. 23, 2015, titled Systems and Methods For Maintaining a Hot Car in a Coke Plant.
U.S. Appl. No. 16/897,957, filed Jun. 10, 2020, titled Systems and Methods For Maintaining a Hot Car in a Coke Plant.
U.S. Appl. No. 13/829,588, now U.S. Pat. No. 9,193,915, filed Mar. 14, 2013, titled Horizontal Heat Recovery Coke Ovens Having Monolith Crowns.
U.S. Appl. No. 15/322,176, filed Dec. 27, 2016, now U.S. Pat. No. 10,526,541, titled Horizontal Heat Recovery Coke Ovens Having Monolith Crowns.
U.S. Appl. No. 15/511,036, filed Mar. 14, 2017, titled Coke Ovens Having Monolith Component Construction.
U.S. Appl. No. 16/704,689, filed Dec. 5, 2019, titled Horizontal Heat Recovery Coke Ovens Having Monolith Crowns.
U.S. Appl. No. 13/589,009, filed Aug. 17, 2012, titled Automatic Draft Control System for Coke Plants.
U.S. Appl. No. 15/139,568, filed Apr. 27, 2016, titled Automatic Draft Control System for Coke Plants.
U.S. Appl. No. 13/588,996, now U.S. Pat. No. 9,243,186, filed Aug. 17, 2012, titled Coke Plant Including Exhaust Gas Sharing.
U.S. Appl. No. 14/959,450, filed Dec. 4, 2015, now U.S. Pat. No. 10,041,002, titled Coke Plant Including Exhaust Gas Sharing, now U.S. Pat. No. 10,041,002.
U.S. Appl. No. 16/047,198, filed Jul. 27, 2018, now U.S. Pat. No. 10,611,965, titled Coke Plant Including Exhaust Gas Sharing.
U.S. Appl. No. 16/828,448, filed Mar. 24, 2020, titled Coke Plant Including Exhaust Gas Sharing.
U.S. Appl. No. 13/589,004, now U.S. Pat. No. 9,249,357, filed Aug. 17, 2012, titled Method and Apparatus for Volatile Matter Sharing in Stamp-Charged Coke Ovens.
U.S. Appl. No. 13/730,673, filed Dec. 28, 2012, titled Exhaust Flow Modifier, Duct Intersection Incorporating The Same, and Methods Therefor.
U.S. Appl. No. 15/281,891, filed Sep. 30, 2016, titled Exhaust Flow Modifier, Duck Intersection Incorporating The Same, and Methods Therefor.
U.S. Appl. No. 13/598,394, now U.S. Pat. No. 9,169,439, filed Aug. 29, 2012, titled Method and Apparatus for Testing Coal Coking Properties.
U.S. Appl. No. 14/865,581, filed Sep. 25, 2015, now U.S. Pat. No. 10,053,627, titled Method and Apparatus for Testing Coal Coking Properties, now U.S. Pat. No. 10,053,627.
U.S. Appl. No. 14/839,384, filed Aug. 28, 2015, titled Coke Oven Charging System.
U.S. Appl. No. 15/443,246, now U.S. Pat. No. 9,976,089, filed Feb. 27, 2017, titled Coke Oven Charging System.
U.S. Appl. No. 14/587,670, filed Dec. 31, 2014, now U.S. Pat. No. 10,619,101, titled Methods for Decarbonizing Coking Ovens, and Associated Systems and Devices.
U.S. Appl. No. 16/845,530, filed Apr. 10, 2020, titled Methods for Decarbonizing Coking Ovens, and Associated Systems and Devices.
U.S. Appl. No. 14/984,489, filed Dec. 30, 2015, titled Multi-Modal Beds of Coking Material.
U.S. Appl. No. 14/986,281, filed Dec. 31, 2015, titled Multi-Modal Beds of Coking Material.
U.S. Appl. No. 14/987,625, filed Jan. 4, 2016, titled Integrated Coke Plant Automation and Optimization Using Advanced Control and Optimization Techniques.

(56) References Cited

OTHER PUBLICATIONS

U.S. Appl. No. 14/839,493, filed Aug. 28, 2015, now U.S. Pat. No. 10,233,392, titled Method and System for Optimizing Coke Plant Operation and Output.
U.S. Appl. No. 16/251,352, filed Jan. 18, 2019, titled Method and System for Optimizing Coke Plant Operation and Output.
U.S. Appl. No. 14/839,551, filed Aug. 28, 2015, now U.S. Pat. No. 10,308,876, titled Burn Profiles for Coke Operations.
U.S. Appl. No. 16/428,014, filed May 31, 2019, titled Improved Burn Profiles for Coke Operations.
U.S. Appl. No. 14/839,588, filed Aug. 28, 2015, now U.S. Pat. No. 9,708,542, titled Method and System for Optimizing Coke Plant Operation and Output.
U.S. Appl. No. 15/392,942, filed Dec. 28, 2016, now U.S. Pat. No. 10,526,542, titled Method and System for Dynamically Charging a Coke Oven.
U.S. Appl. No. 16/735,103, filed Jan. 6, 2020, titled Method and System for Dynamically Charging a Coke Oven.
U.S. Appl. No. 15/614,525, filed Jun. 5, 2017, titled Methods and Systems for Automatically Generating a Remedial Action in an Industrial Facility.
U.S. Appl. No. 15/987,860, filed May 23, 2018, now U.S. Pat. No. 10,851,306, titled System and Method for Repairing a Coke Oven.
U.S. Appl. No. 17/076,563, filed Oct. 21, 2020, titled System and Method for Repairing a Coke Oven.
U.S. Appl. No. 16/729,053, filed Dec. 27, 2019, titled Oven Uptakes.
U.S. Appl. No. 16/729,036, filed Dec. 27, 2019, titled Systems and Methods for Treating a Surface of a Coke Plant.
U.S. Appl. No. 16/729,201, filed Dec. 27, 2019, titled Gaseous Tracer Leak Detection.
U.S. Appl. No. 16/729,122, filed Dec. 27, 2019, titled Methods and Systems for Providing Corrosion Resistant Surfaces in Contaminant Treatment Systems.
U.S. Appl. No. 16/729,068, filed Dec. 27, 2019, titled Systems and Methods for Utilizing Flue Gas.
U.S. Appl. No. 16/729,129, filed Dec. 27, 2019, titled Coke Plant Tunnel Repair and Flexible Joints.
U.S. Appl. No. 16/729,170, filed Dec. 27, 2019, titled Coke Plant Tunnel Repair and Anchor Distribution.
U.S. Appl. No. 16/729,157, filed Dec. 27, 2019, titled Particulate Detection for Industrial Facilities, and Associated Systems and Methods.
U.S. Appl. No. 16/729,057, filed Dec. 27, 2019, titled Decarbonization of Coke Ovens and Associated Systems and Methods.
U.S. Appl. No. 16/729,212, filed Dec. 27, 2019, titled Heat Recovery Oven Foundation.
U.S. Appl. No. 16/729,219, filed Dec. 27, 2019, titled Spring-Loaded Heat Recovery Oven System and Method.

\* cited by examiner

MULTI-MODAL BEDS OF COKING MATERIAL

CROSS-REFERENCE TO RELATED APPLICATIONS

This application claims the benefit of priority to U.S. Provisional Patent Application No. 62/098,935, filed Dec. 31, 2014, the disclosure of which is incorporated herein by reference in its entirety.

TECHNICAL FIELD

The present technology is generally directed to the combination of two or more materials having different sizes to form a bed of coking material with a higher density than predicted by ideal mixing laws.

BACKGROUND

Iron and steel are vital parts of the global economy. The World Steel Association reported that 1.1 billion tons of raw iron was produced globally by blast furnaces in 2013. This process uses coke and iron ore as its main raw materials. Coke is a solid carbon fuel and carbon source used to melt and reduce iron ore in the production of steel. Coke is produced by exposing properly selected and prepared blend of bituminous coals to the high temperatures of a coke oven for an adequate period of time in the absence of air. During the entire conversion, volatile gases, vapors and tars are being expelled from the charge. As the temperatures of the charge increases in the reducing coke oven atmosphere, the coking coals pass through a plastic or softening stage, gasses and tars are evolved, coal particles swell and shrink and then bond or adhere together re-solidifying into a semi coke and finally a coke at about 1830 degrees Fahrenheit. Coking coals are unique with respect to this unusual behavior when heated. The coals are solid when charged, become fluid to varying degrees, then with further increase in temperature, become the solid, hard porous substance, known as coke. Coke is porous black to silver gray substance. It is high in carbon content, low in non-carbon impurities such as sulfur and ash. Physically, the coke produced is strong, resistant to abrasion, and sized to span a narrow size range.

The melting and fusion process undergone by the coal particles during the heating process is an important part of coking. The degree of melting and degree of assimilation of the coal particles into the molten mass determine the characteristics of the coke produced. In order to produce the strongest coke from a particular coal or coal blend, there is an optimum ratio of reactive to inert entities in the coal. The porosity and strength of the coke are important for the ore refining process and are determined by the coal source and/or method of coking.

Coal particles or a blend of coal particles are charged into hot ovens, and the coal is heated in the ovens in order to remove volatile matter ("VM") from the resulting coke. The coking process is highly dependent on the oven design, the type of coal, and the conversion temperature used. Typically, ovens are adjusted during the coking process so that each charge of coal is coked out in approximately the same amount of time. Once the coal is "coked out" or fully coked, the coke is removed from the oven and quenched with water to cool it below its ignition temperature. Alternatively, the coke is dry quenched with an inert gas. The quenching operation must also be carefully controlled so that the coke does not absorb too much moisture. Once it is quenched, the coke is screened and loaded into rail cars, trucks, or onto belt conveyors, for shipment.

As the source of coal suitable for forming metallurgical coal ("coking coal") has decreased, attempts have been made to blend weak or lower quality coals ("non-coking coal") with coking coals to provide a suitable coal charge for the ovens. One way to combine non-coking and coking coals is to use compacted or stamp-charged coal. The coal may be compacted before or after it is in the oven. In some embodiments, a mixture of non-coking and coking coals is compacted to greater than 50 pounds per cubic foot in order to use non-coking coal in the coke making process. As the percentage of non-coking coal in the coal mixture is increased, higher levels of coal compaction are required (e.g., up to about 65 to 75 pounds per cubic foot). Commercially, coal is typically compacted to about 1.15 to 1.2 specific gravity (sg) or about 70-75 pounds per cubic foot.

The manner in which coals are selected, prepared and combined greatly effects the properties of the coke produced. Coals must be reduced in size by grinding to optimal levels and then thoroughly mixed to ensure good distribution of coal particles that will promote the maximum coke quality achievable form the available coals. In North America, coke makers generally pulverize their coals or blends to 75% to 95% minus ⅛" size. The size the coal is crushed is expressed as % minus ⅛" is commonly referred to as the pulverization level. In addition to size control, bulk density must be controlled. High bulk density can cause hard-pushing and damage coke oven walls in a byproduct coke oven. Low bulk density can reduce the strength of the coke produced.

Two coke oven technologies dominate the industry: by-product coke ovens and heat recovery coke ovens. The majority of the coke produced in the United States comes from by-product oven batteries. This technology charges coal into a number of slot type ovens wherein each oven shares a common heating flue with the adjacent oven. Natural gas and other fuels are used to provide heat to the ovens. Coal is carbonized in the reducing atmosphere, under positive (higher than atmospheric) pressure and the gasses and tars that evolve (off-gases) are collected and sent to a by-product plant where various by-products are recovered. Coal to coke transformation in a by-product oven takes place when the heat is transferred from the heated brick walls into the coal charge. The coal decomposes to form plastic layers near each wall and these layers progress toward the center of the oven. Once the plastic layers have met in the center of the oven, the entire mass is carbonized.

Alternatively, using heat-recovery, non-recovery, or beehive oven technology, coal is charged to large oven chambers operated under negative (lower than atmospheric) pressure. The carbonization process takes place from the top by radiant heat transfer and from the bottom by conduction of heat through the sole floor. Primary combustion air is introduced into the oven chamber through several ports located above the charge level. The evolving gasses and tar are combusted in the top chamber and soles of the oven and provide the heat for the coking process. In heat recovery ovens, excess thermal energy from the combusted gases is recovered in the waste heat recovery boiler and converted to steam or power. Coal to coke transformation in a heat-recovery, non-recovery and beehive oven takes place when the heat is transferred from the heated brick floor or radiant heat from the top of the coal bed into the coal charge. The coal decomposes to form plastic layers near the wall and the top of the bed and these layers progress toward the center of the oven. Once the plastic layers have met in the center of the oven, the entire mass is carbonized.

The rate of movement of the plastic layer to the center of the coal bed in both by-product and heat-recovery ovens is limited by the conductive heat transfer rate of the coal bed. Coal chemistry and bed density have a major impact on the heat transfer rate which ultimately sets the oven cycle time and battery production capacity. By-product ovens generally have cycle times between 17 to 24 hours per charge. Heat-recovery ovens generally have cycle times between 24 and 48 hours per charge.

The common method to increase bulk density of the coal charge to the oven is to compact the coal bed prior to or after it is charged by mechanical means known as stamp charging. While a stamp charge method can successfully increase the overall bulk density of the coal charge, it requires expensive equipment to perform the compaction. In heat recovery ovens, it results in a longer coking cycle because the closely packed particles release VM slower than a loosely packed bed. At the same time, stamp charging's higher density leads to improved coke quality. This allows attaining a higher coke quality and the option to substitute lower cost, lower quality coals. In the United States, there is an abundance of high quality low cost coal. The abundance of low cost, high quality coal and the high cost of installing a stamp charger has led to stamp chargers not being employed in the United States. Any low cost method to improve coal density without stamp charging would have application in the United States to improve coke quality and possibly use some lower cost coals or coal substitutes.

Loosely packed bed density is determined by the height of the coal bed and the specified coal size. Bed height is determined by the geometry of the coke oven and cannot be generally varied. Coals are typically crushed to a specified top size, have a naturally occurring particle size distribution that, when plotted, fit under a typical single Gaussian curve. Such naturally occurring size distribution does not have the optimum particle size distribution to produce the optimal density of a loosely packed coal bed.

With reference to FIG. 1, a traditional bed of coal 100, which is loosely charged into a coke oven, is formed from a plurality of individual pieces of coal 102 that randomly orient themselves. This leaves significant voids 104 between the pieces of coal 102 that do not have complementary shapes. Accordingly, orientation determines the packing efficiency and, ultimately, the bulk density of the bed 100. As the size distribution of the coal decreases, the individual pieces of coal get smaller, and the packing efficiency decreases. What was previously a single piece of coal with no void spaces now accounts for multiple pieces, each oriented differently, forming void spaces between the pieces. Therefore, the bulk density of the entire bed decreases as the size distribution of the coal decreases.

A blend of material created by mixing different grind sizes of particles is expected to follow "ideal mixing characteristics." In other words, the volume of the mixture should vary linearly with composition. Combining a material A of higher bulk density with a material B of lower bulk density, accordingly, should result in a blend of material with a bulk density equal to the weighed sum of the pure bulk densities of each of the components $\rho A$ and $\rho B$. Thus, the bulk density of the blended bed of material A and B would be:

$$\rho = \rho A \times XZ + \rho E \times XB$$

Where XA is the weight fraction of material A and XB is the weight fraction of material B. This same blending characteristic extends to blends of 2 or more materials.

Coke chemistry, coke size, and coke strength (stability) have been considered the most important factors for evaluating coke for use in a blast furnace. However, coke reactivity index (CRI) and coke strength after reaction (CSR) are increasing in importance as their impact on blast furnace performance is better understood. For example, a decrease in coke consumption during hot metal production can be linked to increases in CSR values. The magnitude of coke rate reduction varies with changes in blast furnaces size and operating parameters. However, it is estimated that 2 to 5 lbs. of coke are saved per net ton of hot metal produced for every point that CSR increases.

As a result of major changes in blast furnace design and operating parameters, the amount of coke consumed in blast furnaces has dropped below 1000 lbs. per net ton of hot metal produced, requiring increased coke quality. Consequently, the need for strong and consistent coke properties has become more important than ever.

Coke reactivity is a weight loss reaction in which the coke carbon reacts with oxidizing gases such as carbon dioxide. The test reacts lump-sized coke with carbon dioxide at high temperatures. In an exemplary test, a 200 g sample of −21 mm to +19 mm coke is heated to 1,100° C. under one atmosphere pressure of carbon dioxide for two hours. The percentage weight loss is known as the coke reactivity index (CRI). The reacted coke is then tumbled in a drum for a period of time to determine its strength after reacting. The cumulative percent of +10 mm coke after tumbling is referred to as the CSR. A coal that achieves a low CRI value and a high CSR value, after coking, is most favorable in the market because these values relate to blast furnace performance and, specifically, fuel rate and permeability of the burden.

Coke should not react significantly at lower temperatures in the upper zone of the blast furnace to avoid premature coke consumption, which wastes carbon. Highly reactive coke becomes substantially weakened so that it cannot properly support the other burden materials during its descent in the blast furnace. By the time the coke descends on the blast furnace high temperature combustion zone, or raceway, the highly reactive coke becomes so weak that it causes major upsets to occur in raceway performance. Poor raceway performance restricts gas and liquid permeability in the blast furnace, reducing overall furnace efficiency.

Coke stability is the most widely used measure of coke strength employed in the United States. High stability coke is required to support the load of the other burden materials charged to the furnace. High coke stability is also linked to a reduction in the amount of coke consumed in the blast furnace for each ton of hot metal produced. The coke savings are different for each blast furnace and different operating conditions. As a general rule, about 10 lbs. of coke are saved, per net ton of hot metal produced, for every point that stability increases.

The stability test measures resistance to abrasion. Lumps of specifically sized coke are tumbled in a controlled test. After the tumbling is complete, the sample is screened at 1 inch and ¼ inch. The percentage of coke retained on the 1 inch screen is termed stability factor. The cumulative percentage of coke retained on the ¼ inch screen is termed hardness factor. No relationship exists between stability and CSR.

Coke tumbler tests measure the resistance of coke to impact and abrasion during removal from the coke oven and transportation, and the abrasion that occurs during its descent in the blast furnace. In one tumbler test, a micum drum is used. The micum drum is a cylindrical, rotating container made of mild steel and having an internal diameter of one meter. In one common test, a 50 kg sample of coke above 63 mm size is rotated for four minutes at the rate of 25 revolutions/min. The coke is then removed from the drum screened. The percentage of +40 mm coke remaining after screening is designated as M40 on the micum index. The percentage of −10 mm coke remaining after screening is designated as M10 on the micum index. Larger values of M40 and smaller values of M10 generally indicate strong coke. This test is commonly used in Europe to evaluate coke strength.

In another tumbler test, a 10 kg representative sample of +50 mm square hole coke is placed in a specified tumble drum and rotated for 30 revolutions, removed, screened and replaced in the drum and subjected to a further 150 revolutions. In this tumbler test the drum contains lifters that raise the coke and allow it fall so that it undergoes a large number of impacts with the drum walls. The test is based on the Japanese Industrial Standard JIS K2151. A number of indices can be measured. For example, DI3015 represents the percentage of +15 mm square hole material remaining after 30 revolutions. Similarly, DI15015 represents the percentage of +15 mm square hole material remaining after 150 revolutions. For these indices, the larger the number, the stronger the coke. This test is commonly used in Japan, South Korea, and Brazil to evaluate coke strength.

Over the last two decades, coke making capacity has slowly declined in the United States without corresponding decrease in demand. Increased demand for coke and decreased supply in the United States have driven the price of coke up. This has become a major incentive to reduce coke consumption in the blast furnace. The increased cost of coke has caused companies to replace a portion of the coke used in the combustion zone of the blast furnaces with pulverized coal (PCI) and other fuels. Because less coke is being charged to the furnace, the quality requirements of coke have increased in order to maintain the furnace productivity. Higher coke stability (60+), lower coke reactivity (<23) and higher coke CSR (>60) are now generally desired.

Coke chemistry and chemical properties are also extremely important to blast furnace performance. Coke ash, fixed carbon, sulfur and ash chemical properties are, for the most part, directly related to the coals used to produce coke. These properties directly influence blast furnace productivity, burdening practices, and ultimately, the chemistry of the hot metal produced for downstream steelmaking. Increased ash, sulfur and alkali metals increase coke consumption rates in the blast furnace. If coke quality were improved by increasing CSR by 1 point, increasing stability by 1 point, and reducing the coke ash by 1% ash, coke sulfur by 0.1%, coke alkaline metals by 0.01% on a 4500 net ton hot metal per day blast furnace with coal pricing of $115 per ton, a cost savings of several million per year would result. Current coke pricing is over $250 per ton.

For blast furnace use, a narrow size range of coke is required. In general, coke size range from 3 inch by 1 inch is most desired. Coke larger than 4 inches is usually crushed prior to charging and coke smaller than ¾ inch is generally screened out at the coke plant and sold or used as coke breeze. In the United States, most coke produced has less than 10% larger than 4" and less than 6% minus ¾" coke prior to crushing or plant screening. Material screened out under ¾" is called breeze and generally disposed of in a landfill.

Coke size is important because coke is the support mechanism and permeable layer for other burden materials like limestone, iron ore, iron pellets, and sinter. As the coke layer descends downward in the blast furnace, adequate upward and downward permeability must be maintained. Hot metal drops downward through the coke layers. Reducing gases pass upward through the coke layers. Having coke fines present in the layers reduces the permeability of this layer and causes reductions in the production. Coarse coke causes coke waste and can end up as carbon contamination in the hot metal.

For each ton of raw iron, 0.5 to 0.65 tons of metallurgical coke are consumed. The global market consumes an estimated 700 million tons of coke annually. Breeze, a major byproduct of coke production, typically ranges from 5% to 7% of the coke produced. Breeze is fine coke that cannot be used in a blast furnace over a threshold limit. The coking process normally generates more breeze than a blast furnace can consume. The industry has not been successful in finding a method of consuming or disposing of this material. A major portion of the breeze generated in the United States is landfilled.

DETAILED DESCRIPTION

Figure 1:
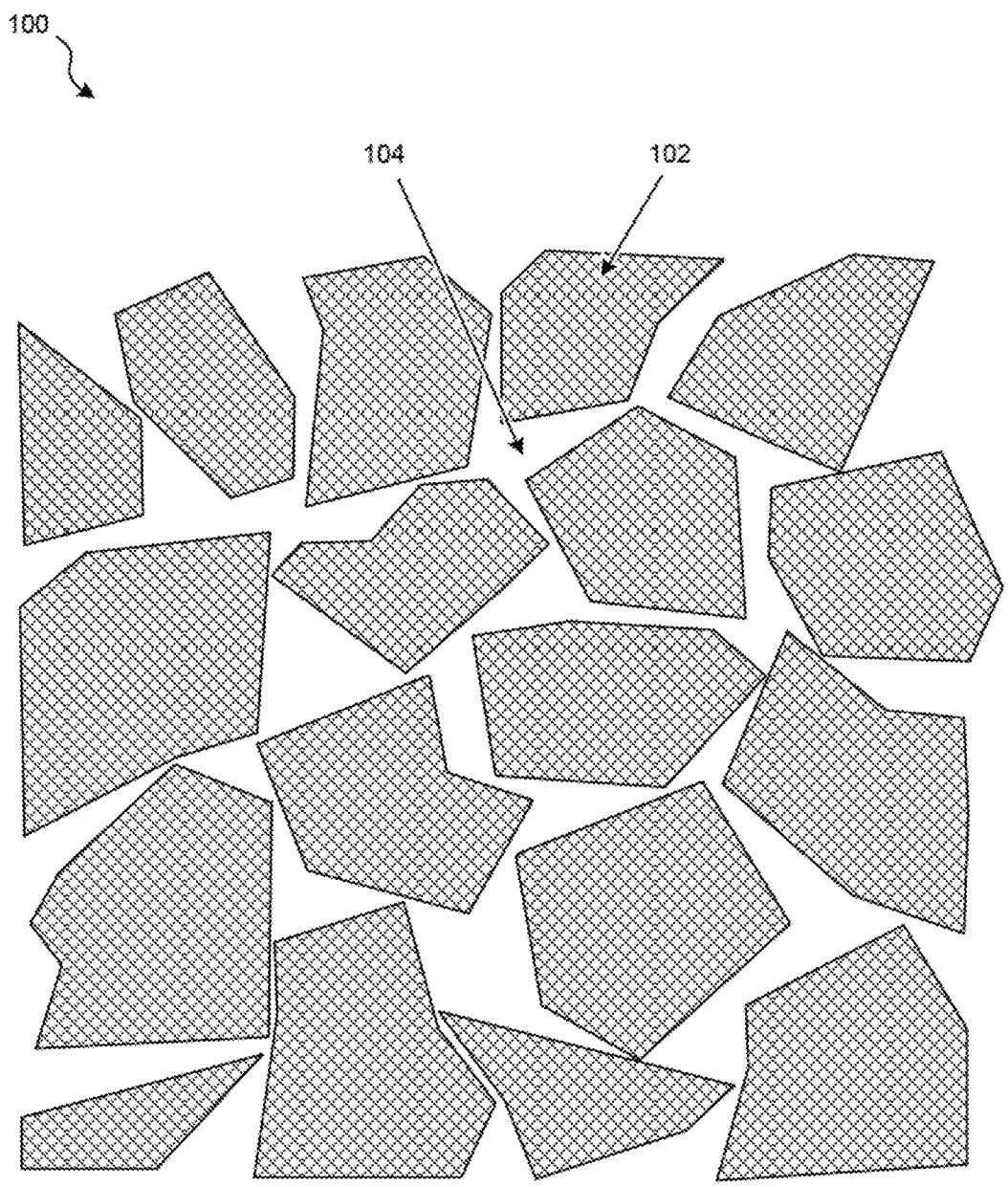
FIG. 1 depicts a partial cross-sectional view of a bed of loosely coking material.

The present technology is generally directed to methods of combining of two or more particulate materials of different bulk densities in combinations that produce beds of coking material with bulk densities that are greater than ideal bulk densities predicted by a linear combination of the bulk densities of the individual particulate materials. In some embodiments, the methods create a bi-modal mixture by combining a quantity of material A of grind G1 with a quantity of material B of grind G2 where the particulate size distribution of grind G1 for material A is not identical to the particulate size distribution of grind G2 for material B. Another embodiment, of the present technology, creates a bi-modal mixture by combining a quantity of material A of grind G1 with a quantity of the same material A of size S2. In this embodiment, G1 is achieved using a grinding of material A and the particulate size distribution is not identical to size S2, which is achieved using a sieve. In further embodiments, material of size S1 is obtained by screening and combined with a material of size S2, which is also obtained by screening. Accordingly, "multi-modal", as the term is used herein, will be understood to mean a distribution or blending of two or more particulate size distributions. In various embodiments, the resulting multi-modal bed of coking material may be obtained using various combinations of similar or dissimilar materials of different particulate size distributions and/or bulk densities. These methods can provide beds of coking material that, when processed in a coking oven, produces coke that exhibits improvements in one or more of: coke stability, size, hardness, coke reactivity index (CRI), drum index, micum index, and CSR.

Specific details of several embodiments of the technology are described below with reference to FIGS. 1-21. Other details describing well-known attributes of coking materials, as well as structures and systems often associated with coke ovens, have not been set forth in the following disclosure to avoid unnecessarily obscuring the description of the various embodiments of the technology. Many of the materials, combinations, particulate sizes, bulk densities, and other details described herein and shown in the Figures are merely illustrative of particular embodiments of the present technology. Accordingly, other embodiments can have other materials, combinations, particulate sizes, bulk densities, and other details without departing from the spirit or scope of the present technology. A person of ordinary skill in the art, therefore, will understand that the technology may have other embodiments with additional elements and methodological steps, or the technology may have other embodiments without several of the aspects shown and described below with reference to FIGS. 1-21.

Methods of the present technology provide beds of coking material to charge a coking oven. In various embodiments, a quantity of first particulate material "A", having a first particulate size S1 and bulk density $\rho A$, is combined with a second particulate material "B", having a second particulate size S2 and bulk density $\rho B$, to define a multi-modal bed of coking material. The multi-modal bed of coking material exhibits an optimized bulk density that is greater than the "ideal bulk density" predicted by an Ideal Blending Rule. The Ideal Blending Rule, as that term is used herein, is a linear combination of the bulk densities of the individual materials. Specifically, when the bulk densities of any number of materials A, B, ... η is $\rho A$, $\rho B$, ... $\rho \eta$ and present in the blended bed in weight fraction $\chi A$, $\chi B$, ... $\chi \eta$ and the bulk density of a blended bed $\rho$ generated by the present technology is expressed as:

$$\rho \geq \rho A^* \chi A + \rho B^* \chi B + \ldots + \chi \eta$$

In various embodiments, the first particulate material is comprised of a carbon containing material such as one of various coking coals, such as hard coking coal, semi-soft coking coal, thermal coal, and the like. Embodiments of the present technology may use one or more of a wide array of second particulate materials. In some embodiments, the second particulate material may be a carbon containing inert material. In other embodiments, the second particulate material may be a non-carbon containing inert material. In some embodiments, exemplary materials that may be used with the present technology include: coal; anthracite; breeze; petcoke; biochar; biomaterials; lignite; met coals; thermal coal; coke; pad coal; and pad coke. In other embodiments, exemplary materials that may be used with the present technology include: inerts; carbonates; silicates; coke alloys; carbon alloys; flyash; wood; wood chips; biomass; lignin; reclaimed or recovery materials from bioprocesses; catalysts; plastics; recycled plastics; recycled solid hydrocarbons; and other solid hydrocarbons. Non-carbon metallic materials that may be used as the second particulate material, in various embodiments, include: dust fines from industrial processes; iron; iron oxides; and slag. Non-carbon nonmetallic materials that may be used as the second particulate material, in various embodiments, include: sand; alumina; stone dust from quarry operations; dust fines from brick or cement manufacturing; dust fines from polishing operations; catalyst fines from regen operations; and salts. In other embodiments the second material could be the same material as the first particulate material but of a different particle size distribution. In other embodiments the blends can employ a blended bed of two or more particulate materials. In other embodiments blends can also employ the addition of liquids, tars, pitch, oils, liquid hydrocarbons and other additives.

Figure 2:
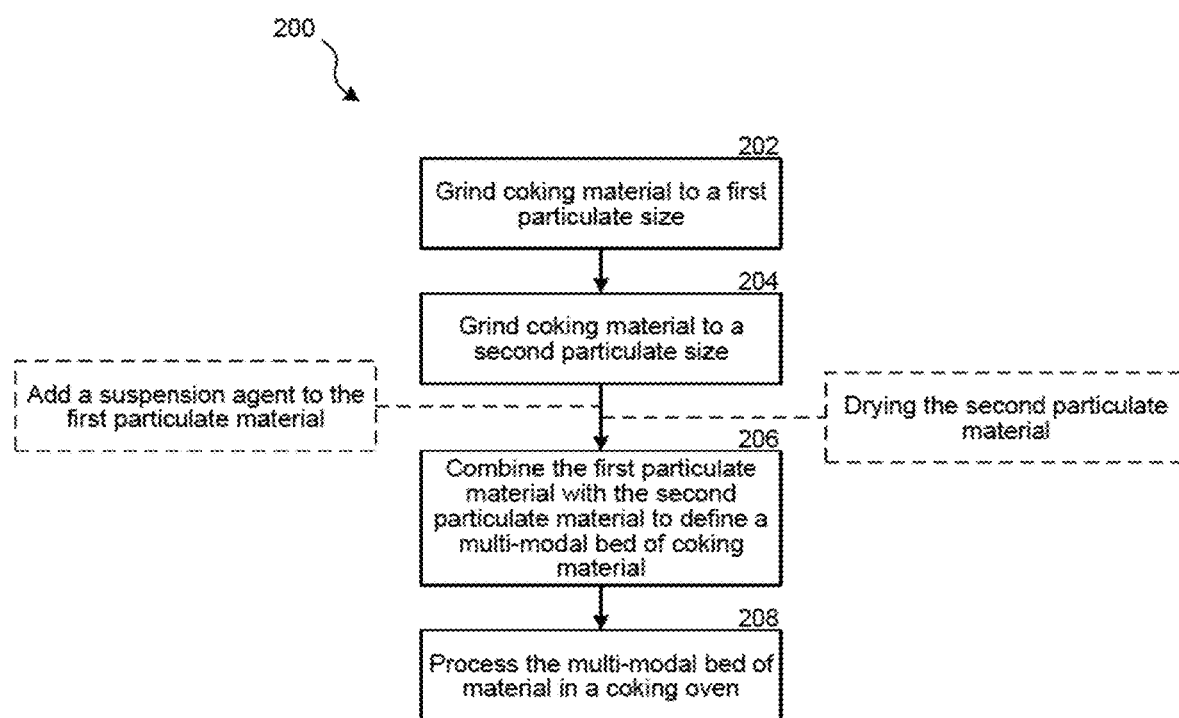
FIG. 2 is a block diagram illustrating one method of preparing and processing a multi-modal bed of coking material oven in accordance with embodiments of the technology.

The multi-modal beds of the present technology are formed by blending the first particulate material and the second particulate material with one another. In some embodiments, the first particulate material and second particulate material are sized prior to blending the two materials. In many embodiments, sizing the first particulate material and second particulate material is accomplished by pulverizing, grinding, or screening the materials to desired sizes using milling and separating equipment known within the industry. It is contemplated that, in any embodiment of the present technology, the first particulate material and the second particulate material may be sized using the same or different milling or separating systems and methods. With reference to FIG. 2, an exemplary process 200 for forming and processing a multi-modal bed of material is depicted. At 202 a coking material is ground to a first particulate size. At 204 a coking material is ground to a second particulate size. Optional steps are depicted for adding a suspension agent to the first particulate material, to increase its moisture content, and drying the second particulate material, to lower its moisture content. The first particulate material and second particulate material are combined with one another to define the multi-modal bed of coking material at 206. Finally, at 208, the multi-modal bed of coking material is processed in the coking oven.

Figure 3:
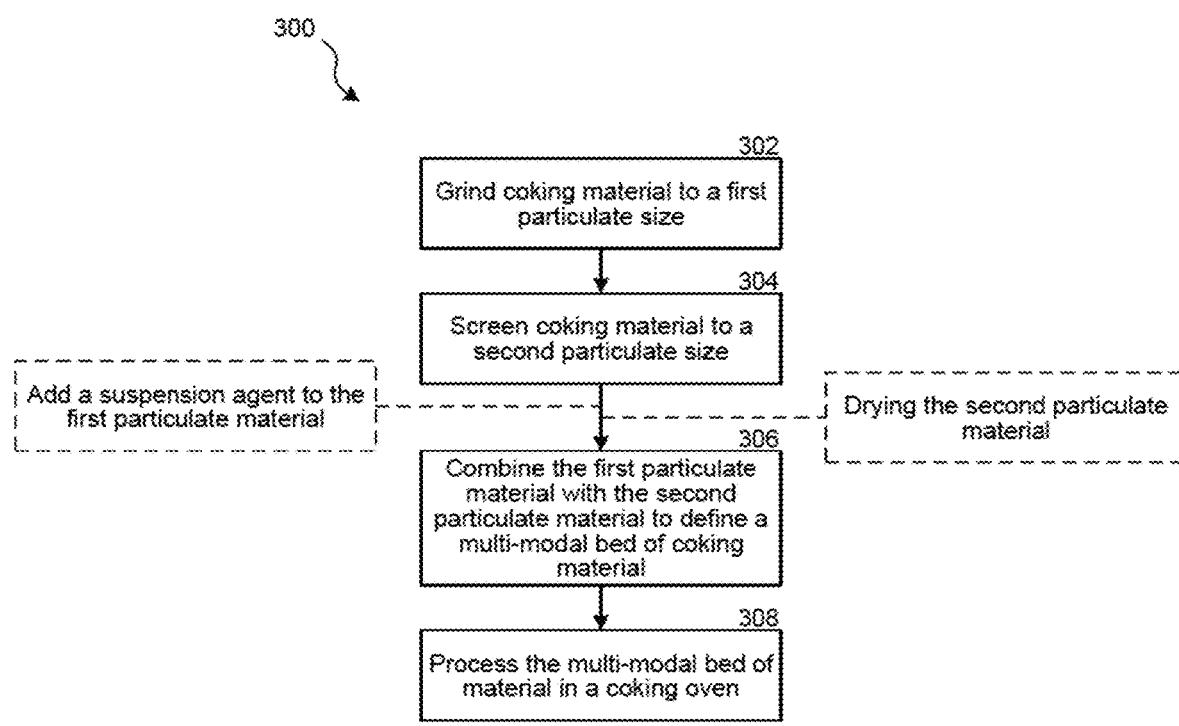
FIG. 3 is a block diagram illustrating another method of preparing and processing a multi-modal bed of coking material oven in accordance with embodiments of the technology.

With reference to FIG. 3, another exemplary process 300 is depicted for forming and processing a multi-modal bed of material. At 302 a coking material is ground to a first particulate size. At 304 a coking material is screened from a volume of coking material to a second particulate size. As discussed above, optional steps are depicted for adding a suspension agent to the first particulate material and drying the second particulate material. The first particulate material and second particulate material are combined with one another to define the multi-modal bed of coking material at 306. Finally, at 308, the multi-modal bed of coking material is processed in the coking oven.

Figure 4:
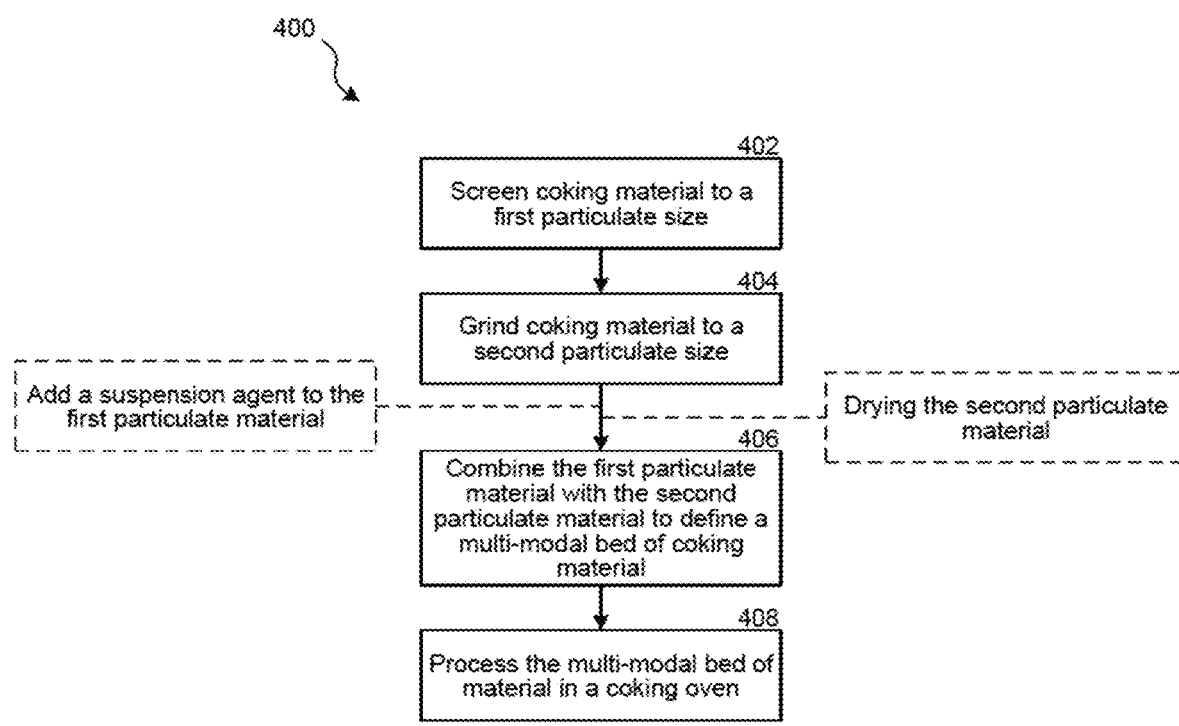
FIG. 4 is a block diagram illustrating a further method of preparing and processing a multi-modal bed of coking material oven in accordance with embodiments of the technology.

FIG. 4 depicts yet another exemplary process 400 forming and processing a multi-modal bed of material. At 402 a coking material is screened from a volume of coking material to a first particulate size. At 404 a coking material is ground from a volume of coking material to a second particulate size. Optional steps are depicted for adding a suspension agent to the first particulate material and drying the second particulate material. The first particulate material and second particulate material are combined with one another, at 406, to define the multi-modal bed of coking material. Finally, at 408, the multi-modal bed of coking material is processed in the coking oven.

Figure 5:
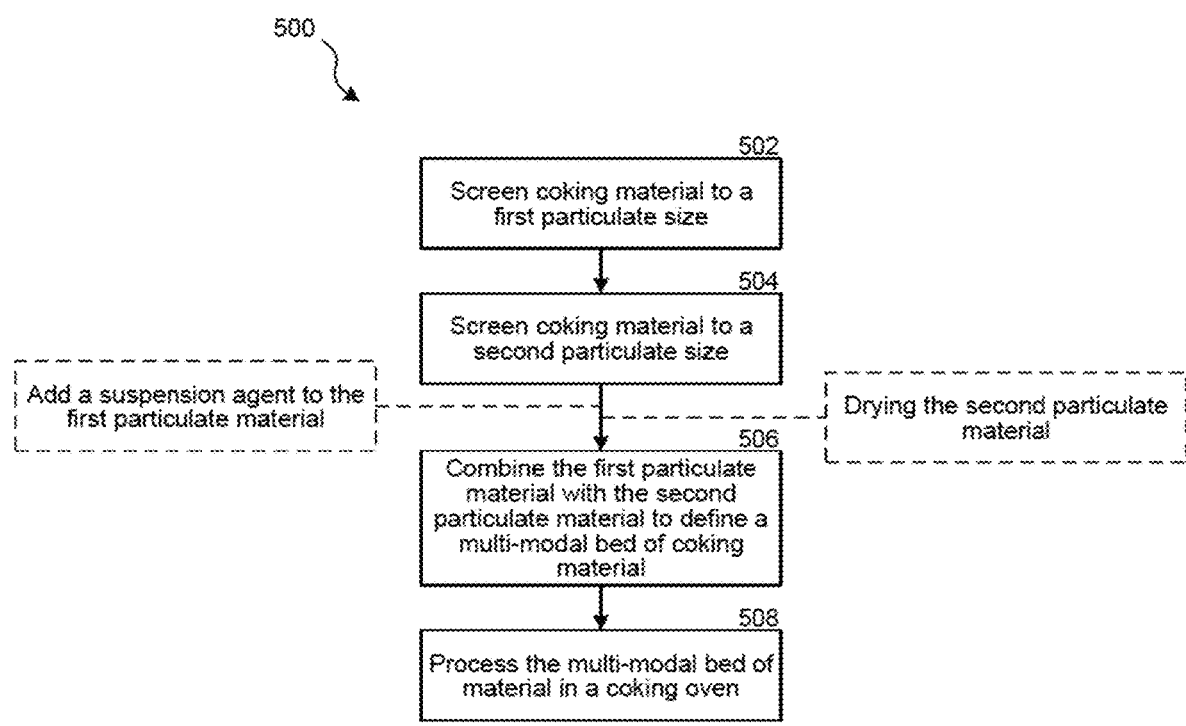
FIG. 5 is a block diagram illustrating yet another method of preparing and processing a multi-modal bed of coking material oven in accordance with embodiments of the technology.

FIG. 5 depicts another exemplary process 500 for forming and processing a multi-modal bed of material is depicted. At 502 a coking material is screened from a volume of coking material to a first particulate size. At 504 a coking material is screened from a volume of coking material to a second particulate size. Optional steps are depicted for adding a suspension agent to the first particulate material and drying the second particulate material. The first particulate material and second particulate material are combined with one another to define the multi-modal bed of coking material at 506. At 508, the multi-modal bed of coking material is processed in the coking oven.

Figure 6:
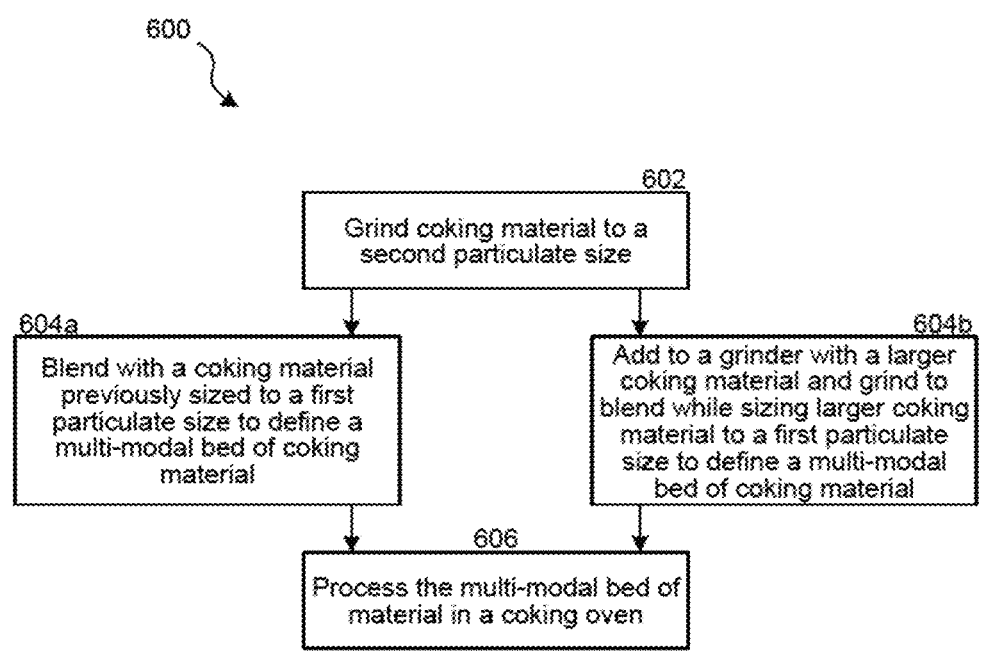
FIG. 6 is a block diagram illustrating a further method of preparing and processing a multi-modal bed of coking material oven in accordance with embodiments of the technology.

With reference to FIG. 6, an exemplary process 600 for forming and processing a multi-modal bed of material is depicted. At 602 a coking material is ground to a second particulate size. At 604a, the second particulate material may be combined or blended with a coking material that was previously sized to a first particulate size to define a multi-modal bed of coking material. Optionally, at 604b, the second particulate material may be added to a grinder with a larger coking material. The grinder is operated to grind the larger coking material to a first particulate size while blending or combining the second particulate with the newly ground first particulate material to define the multi-modal bed of coking material. While not depicted, it is contemplated that the second particulate material may be dried, prior to combining with a first particulate material, to lower its moisture content. Similarly, it is contemplated that a suspension agent could be added to the first particulate material, to increase its moisture content prior to blending or combining with the first particulate material. Finally, at 606, the multi-modal bed of coking material is processed in the coking oven.

Figure 7:
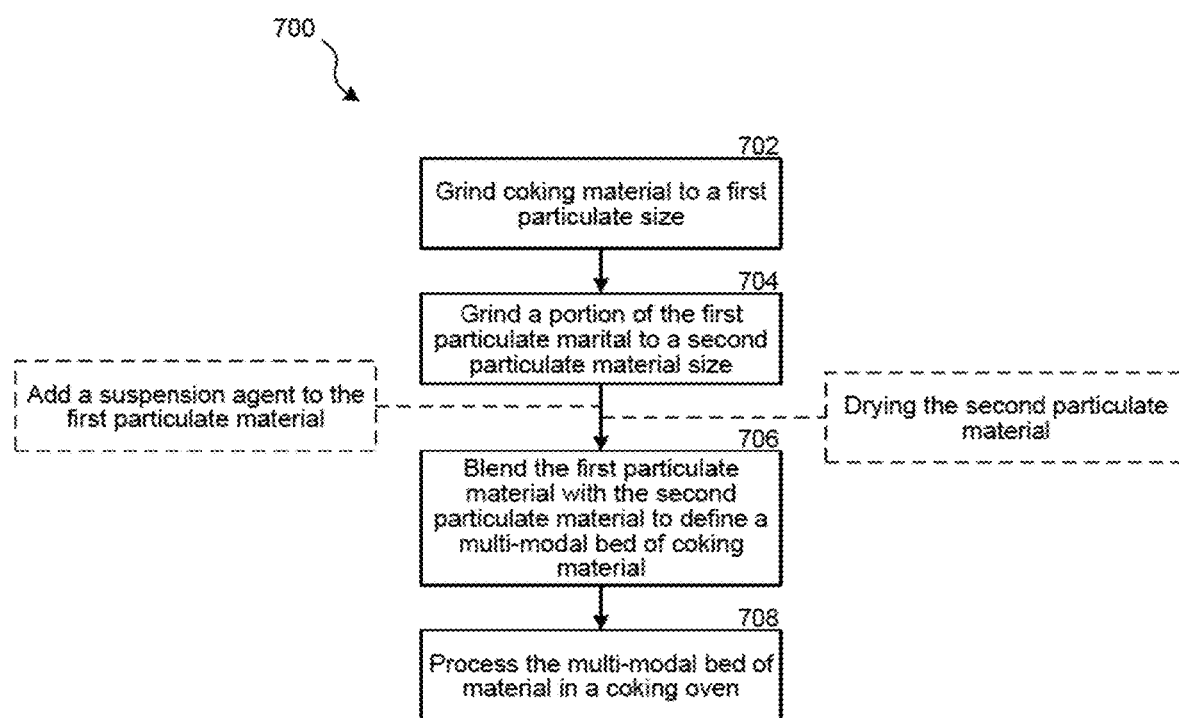
FIG. 7 is a block diagram illustrating another method of preparing and processing a multi-modal bed of coking material oven in accordance with embodiments of the technology.

With reference to FIG. 7, another exemplary process 700 is depicted for forming and processing a multi-modal bed of material. At 702 a coking material is ground to a first particulate size. At 704 a portion of the first particulate material is ground a second time to a second particulate size. Optional steps are depicted for adding a suspension agent to the first particulate material and drying the second particulate material. The first particulate material and second particulate material are combined with one another to define the multi-modal bed of coking material at 706. At 708, the multi-modal bed of coking material is processed in the coking oven.

Figure 8:
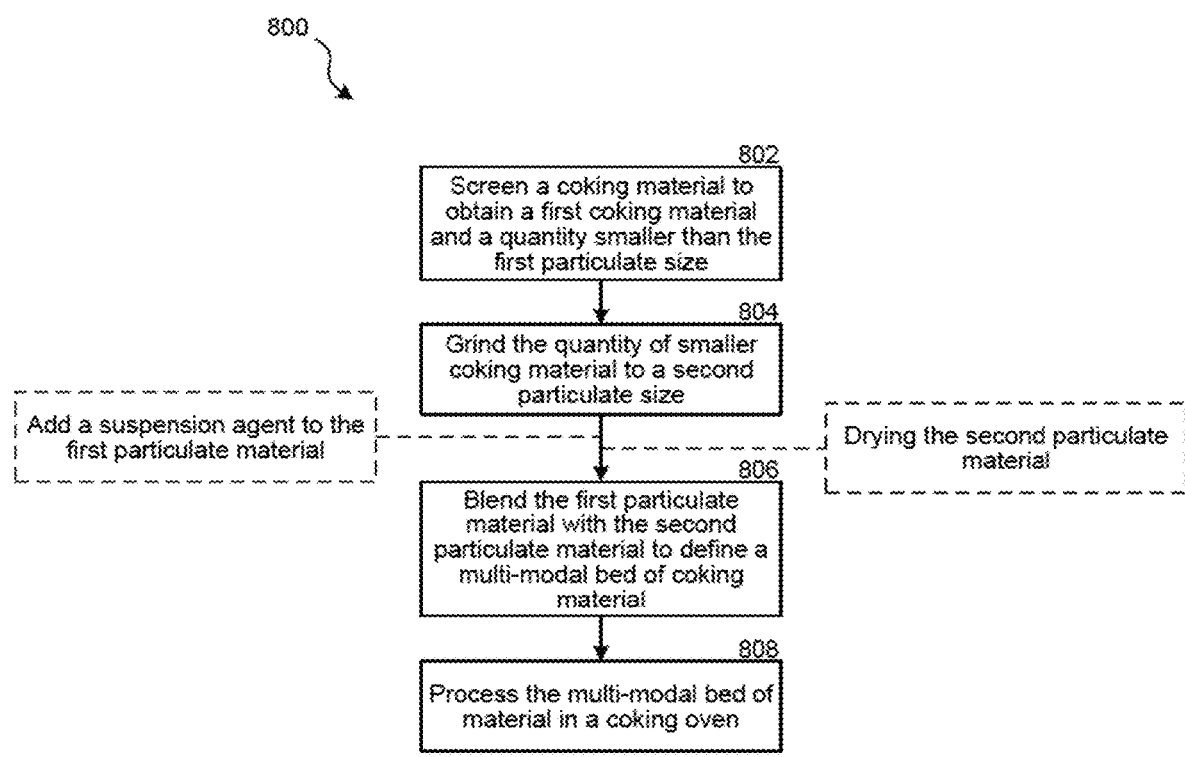
FIG. 8 is a block diagram illustrating a further method of preparing and processing a multi-modal bed of coking material oven in accordance with embodiments of the technology.

FIG. 8 depicts yet another exemplary process 800 for forming and processing a multi-modal bed of material. At 802 a coking material is screened to obtain a first particulate size and a quantity of coking material that is smaller than the first particulate size. The quantity of smaller coking material is then ground, at 804, to a second particulate size. Optional steps are depicted for adding a suspension agent to the first particulate material and drying the second particulate material. The first particulate material and second particulate material are blended or combined with one another to define the multi-modal bed of coking material at 806. Finally, at 808, the multi-modal bed of coking material is processed in the coking oven.

Figure 9:
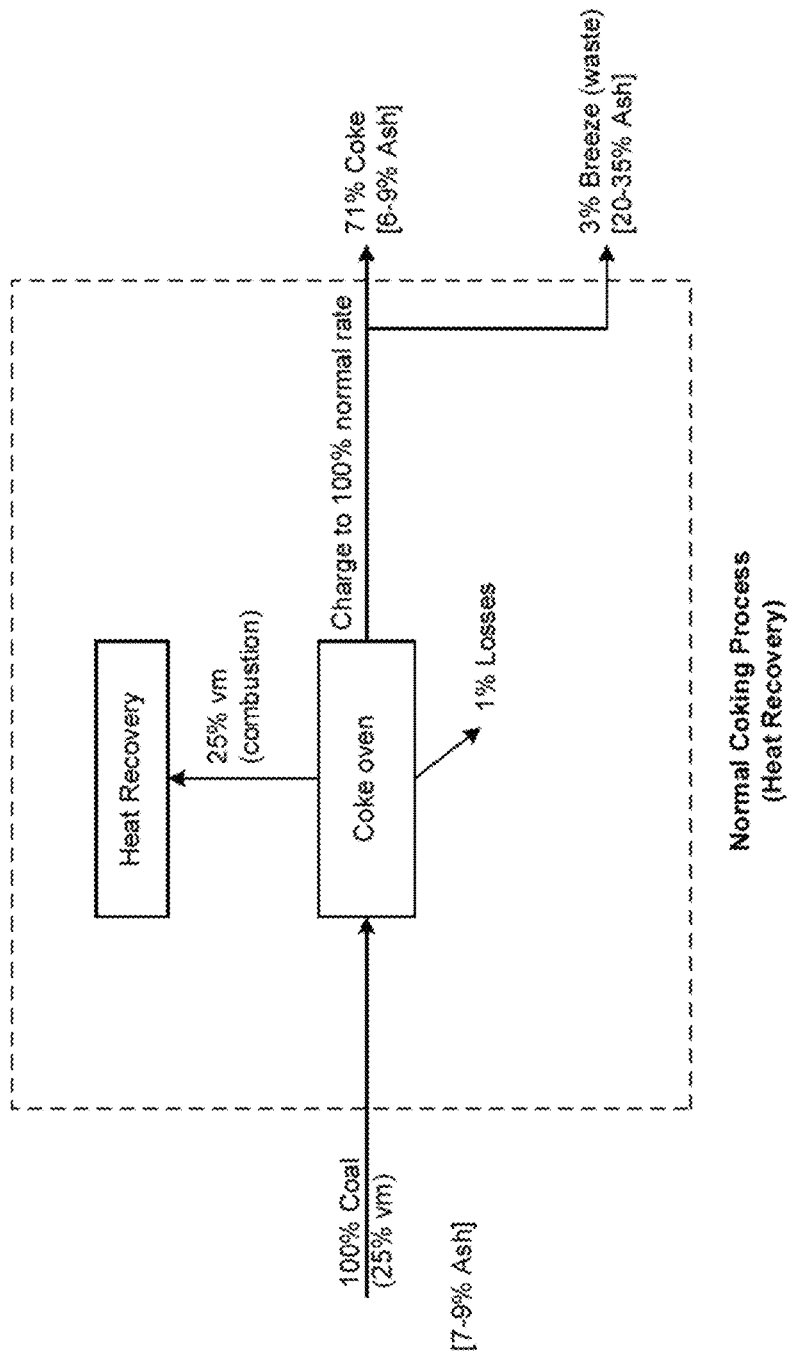
FIG. 9 depicts a schematic view of a process of coking a bed of coking material.

With reference to FIG. 9, a bed of loose coking material (representing 100% of the coking material including approximately 7% to 9% ash) is charged into the coking oven. As the charge of coking material is processed, volatile materials, amounting to 25% of the bed of material, are released and are combusted and, in heat recovery ovens, provide heat during the coking process. An amount of bed material, typically 1% of the total bed of material, is lost during the coking process. Once the bed is processed or "fully coked", the bed is typically quenched and screened, which results in finished coke, containing 6% to 9% ash, amounting to 71% of the original bed of material and 3% breeze that contains approximately 20-35% ash.

Figure 10:
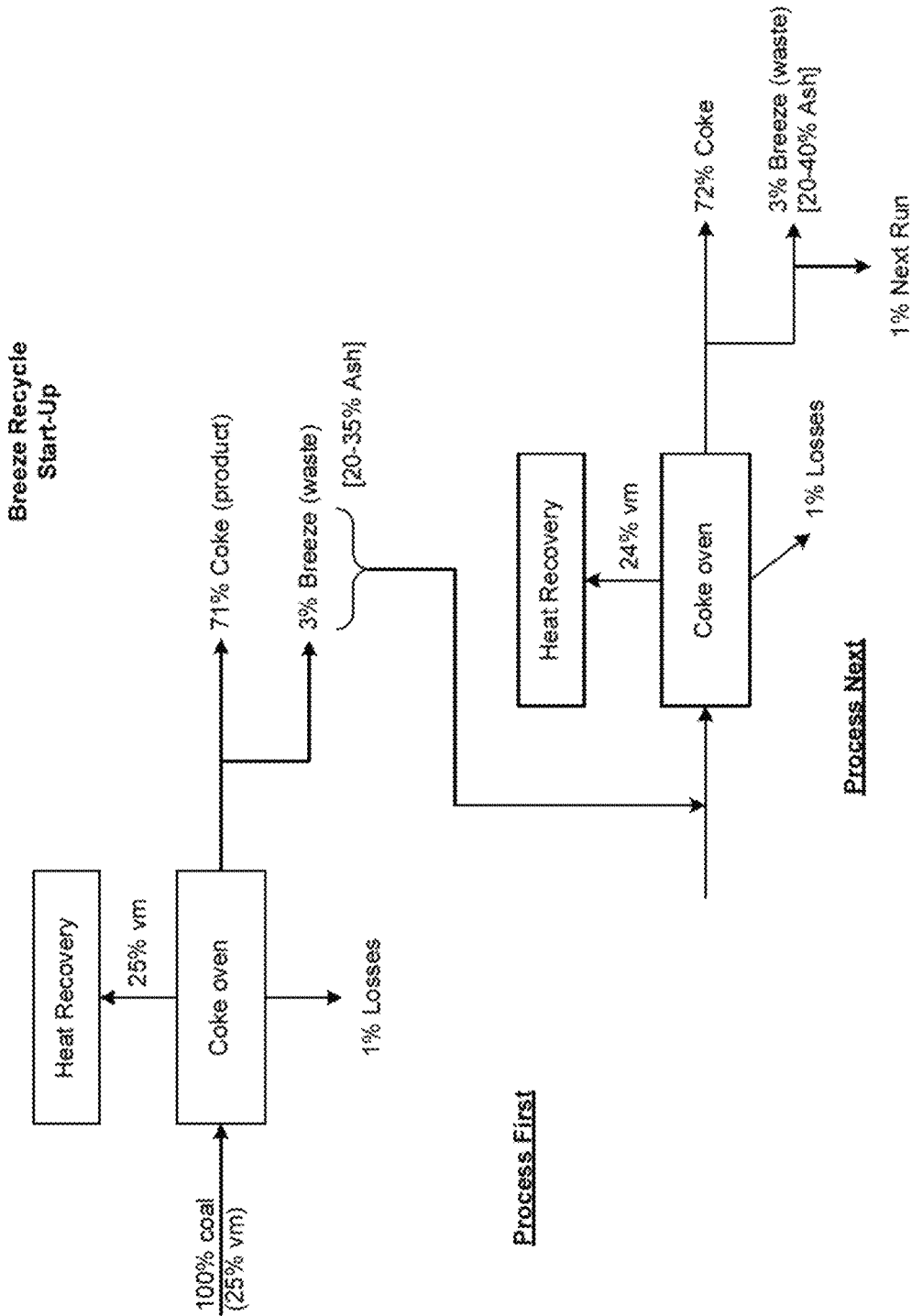
FIG. 10 depicts a schematic view of one embodiment of a plurality of successive coking processes of the present technology wherein a portion of the resulting material from the first coking process is added to the coking material of the second coking process prior to of coking a bed of coking material.

With reference to FIG. 10, material obtained from a coked bed of coal may be "recycled" in subsequent multi-modal beds of coking material. In the depicted exemplary embodiment, the bed of loose coking material of FIG. 9 is coked, releasing volatile materials, amounting to 25% of the bed of material, and losing approximately 1% of the bed material. The process produces finished coke, amounting to 71% of the original bed of material and 3% breeze that contains approximately 20-35% ash. In some embodiments, a portion or all of the breeze may be milled to a second particulate size distribution, which may be used in subsequent beds of coking material. In the depicted embodiment, the milled breeze is blended with a volume of coking coal to create a multi-modal bed of material for the next coking process. It is also contemplated that the breeze may be directly blended with a volume of coking coal, without further milling. The second bed of material is charged into the coking oven. The second bed of material is processed in the coking oven. However, the second bed experiences a slightly lower volatile material loss (24% in the present embodiment) because a portion of the bed is comprised of breeze, which has significantly less volatile material to release. An amount of bed material of approximately 1% of the total bed of material is lost during the second coking process. Once the second bed is processed, the bed is quenched and screened, finished coke amounting to 72% of the original bed of material is produced along with 3% breeze. A portion or all of the breeze may be milled for use in subsequent beds of coking material. Accordingly, the recycle of breeze has demonstrated a higher coke production and lower production of volatile material, compared with known coking methods of loosely-charged beds of coking material. In this manner, waste is not lost to the environment or costly containment systems.

Figure 11:
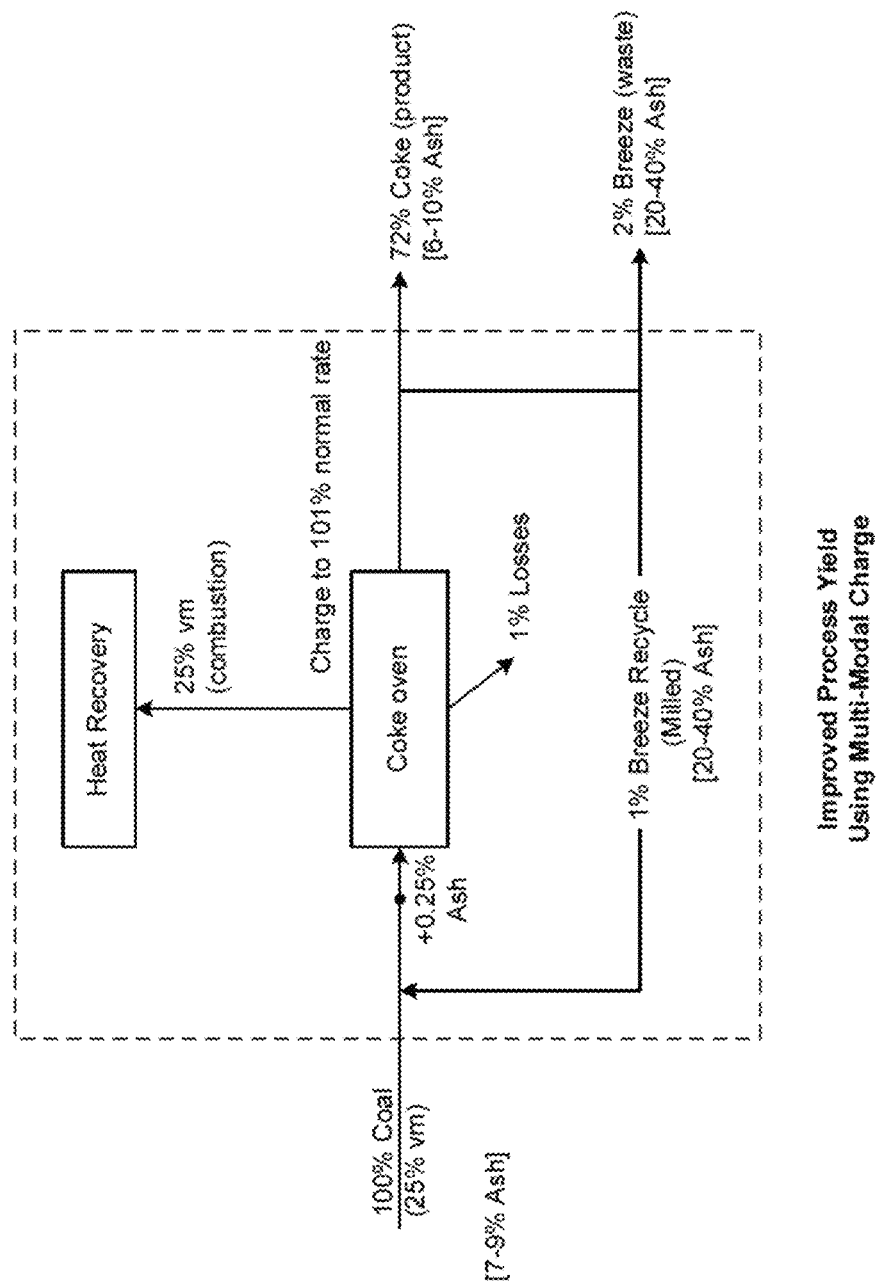
FIG. 11 depicts a schematic view of one embodiment of a process of coking a bed of coking material according to the present technology.

With reference to FIG. 11, a multi-modal bed is created by blending a traditional volume of coking material with an additional 1% (by weight) amount of coking material. The additional coking material is milled breeze material provided by a previous coking process, which in the present embodiment adds an amount of ash equaling approximately 0.25% by weight of the multi-modal bed of coking material. As the charge of coking material is processed, volatile materials, amounting to 25% of the bed of material, are released and approximately 1% of the bed material is lost. Once the bed is processed, coke is produced, amounting to 72% of the original bed of material, containing 6% to 10% ash, and 3% breeze that contains approximately 20-40% ash. In the depicted embodiment, a portion of the breeze may be milled and used in a subsequent bed of coking material. The remaining amount of breeze may be disposed as waste or reserved for use in future beds of coking material. Again, the recycle of breeze results in a higher coke production and lower production of waste material, compared with known coking methods of loosely-charged beds of coking material.

Aspects of the present technology are not limited to the use of breeze as the additional "recycled" coking material in multi-modal beds of coking material. In other embodiments quantities of other coking process waste materials may be used to form the multi-modal beds. In such embodiments, one or more of the following coking process waste materials may be used: breeze; clinker; biochar; recycled refractory material; coke; coal; pad coke; pad coal; bag house dust; fly ash; lime; activated carbon; and quench pond dipping.

Figure 12:
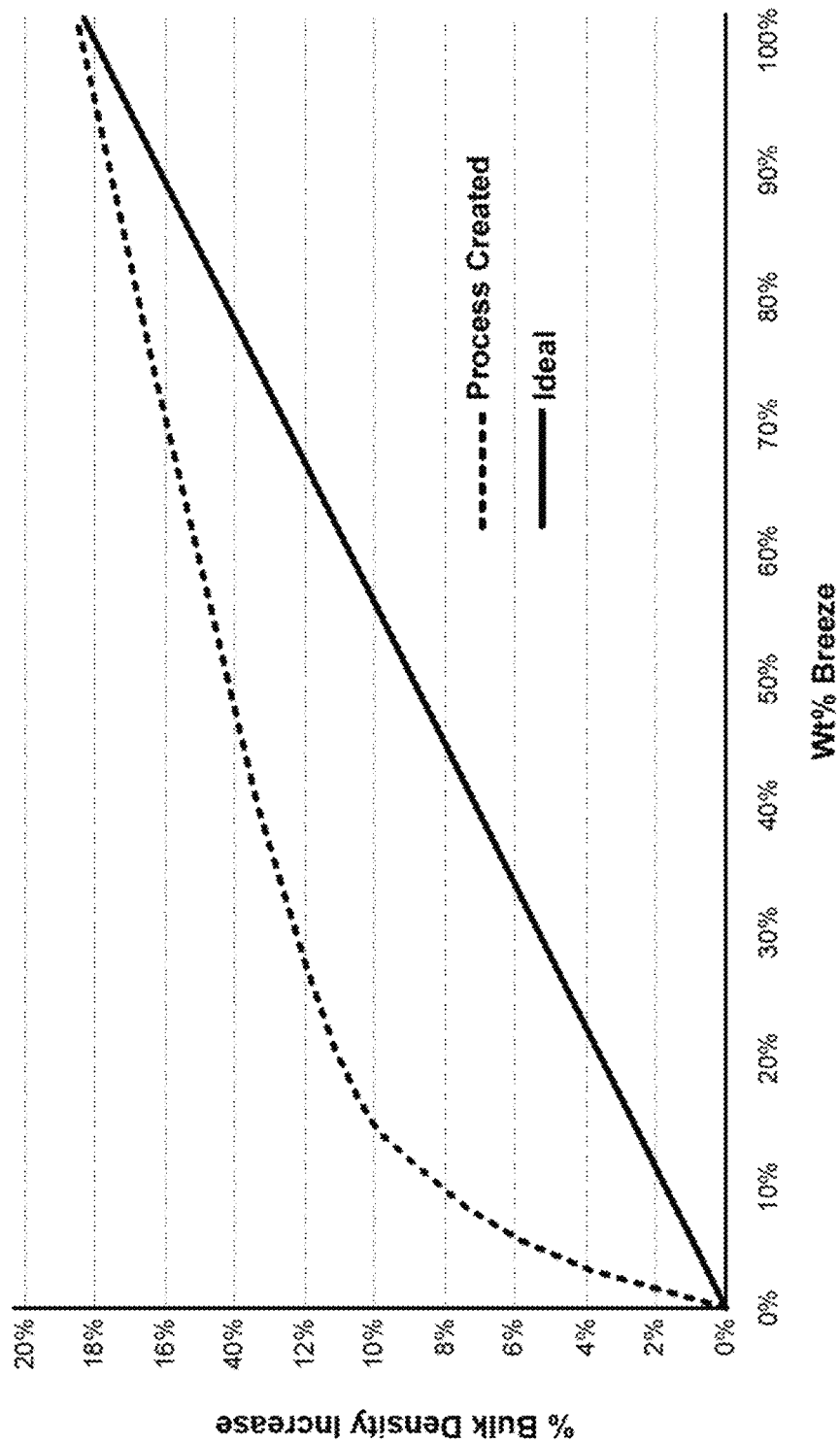
FIG. 12 depicts an exemplary bulk density plot of a mixture of coking material as the weight percent of fine breeze is increased in one embodiment of the present technology.

Multi-modal beds of coking coal, created by the present technology, exhibit a higher bulk density than that expected by the partial contributions of each of the particulate materials used in the mixture. FIG. 12 depicts exemplary bulk density plots of a multi-modal bed produced using test data obtained from one embodiment of the present technology. The "Experimental Results" plot depicts actual bulk density as the weight percent of fine breeze is increased. The "Expected" plot depicts the expected change in bulk density under the Ideal Blending Law. In the test that produced the depicted data, the bulk density of a Gaussian partial size distribution of 90%-150 mesh breeze was determined to have a bulk density of 48.75 lbs/cuft. The bulk density of a Gaussian partial size distribution of coal crushed to 90%-⅛ in was determined to have a bulk density of 41.17 lbs/cuft.

Figure 13:
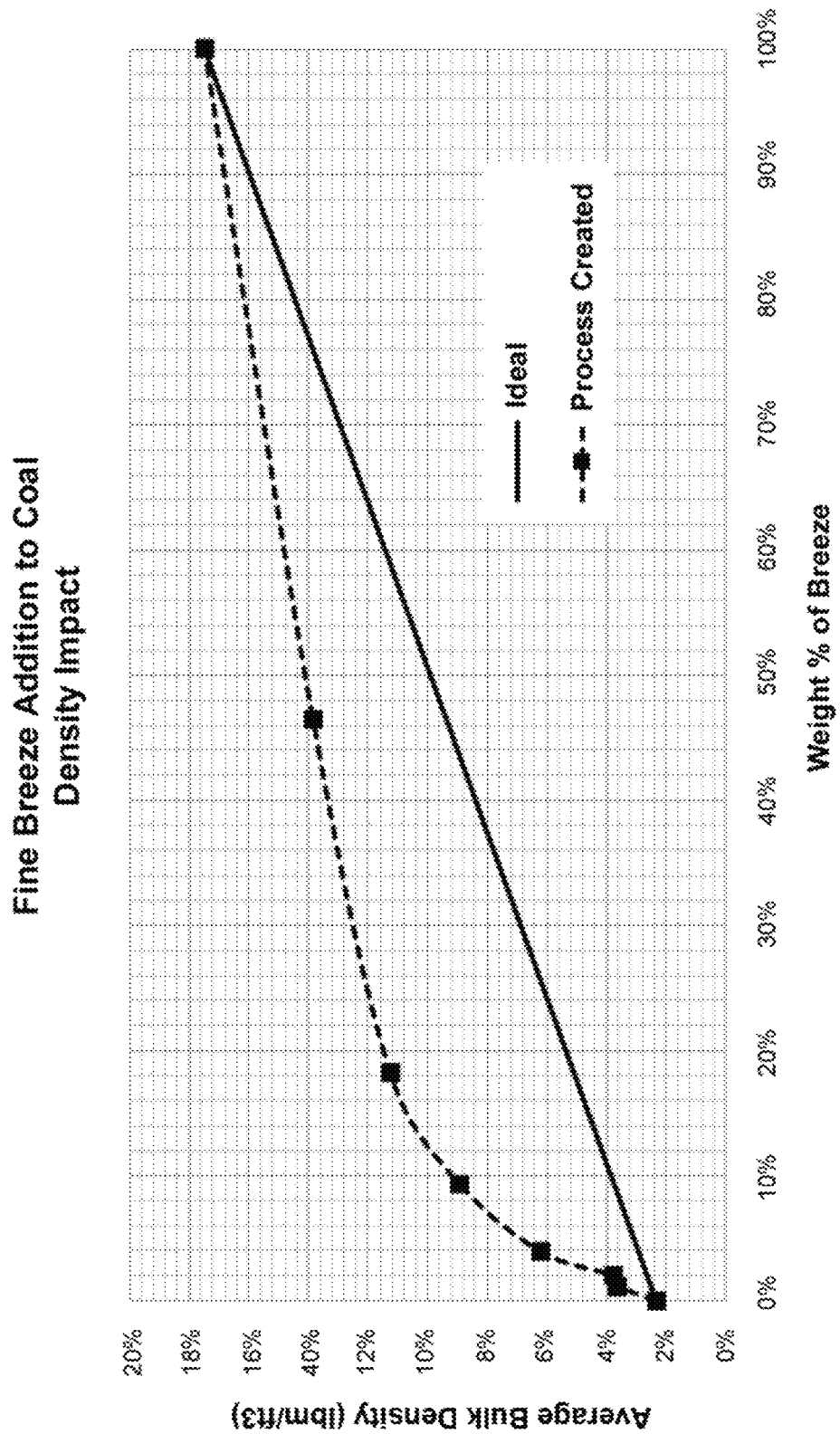
FIG. 13 depicts an exemplary plot of the density impact realized by the addition of fine breeze to coal in one embodiment of the present technology.

The improvement in bulk density, using the present technology, is illustrated by taking one point in the experimental dataset at 4 wt % breeze. Under the Ideal Blending Rule, the final bulk density of the blend would be the linear sum of the partial density contributions of each of the materials such that: 0.96*41.17+0.01+40.75–41.41 lbs/cuft. FIG. 13 plots the density impact realized by the addition of fine breeze to coal. The actual resulting bulk density, through the process, was 43.11 lbs/cuft, as shown in Table 1 below, 4% higher than the ideal blending case. This is achieved when blending in 4% fine breeze into the coal and effectively causing the current volume of the coal to consume the entire volume of breeze added with no corresponding increase in bed volume.

TABLE 1

Process Results v Expected Results - Bulk Density

| Breeze wt % | Coal wt % | Blend Bulk Density Actual (lb/ft3) | Blend Bulk Density Expected (lb/ft3) |
|---|---|---|---|
| 0% | 100% | 41.17 | 41.17 |
| 1% | 99% | 41.81 | 41.26 |
| 2% | 98% | 41.89 | 41.32 |
| 4% | 96% | 43.12 | 41.47 |
| 9% | 91% | 44.47 | 41.88 |
| 18% | 82% | 45.64 | 42.56 |
| 46% | 54% | 46.93 | 44.69 |
| 100% | 0% | 48.75 | 48.75 |

Figure 14:
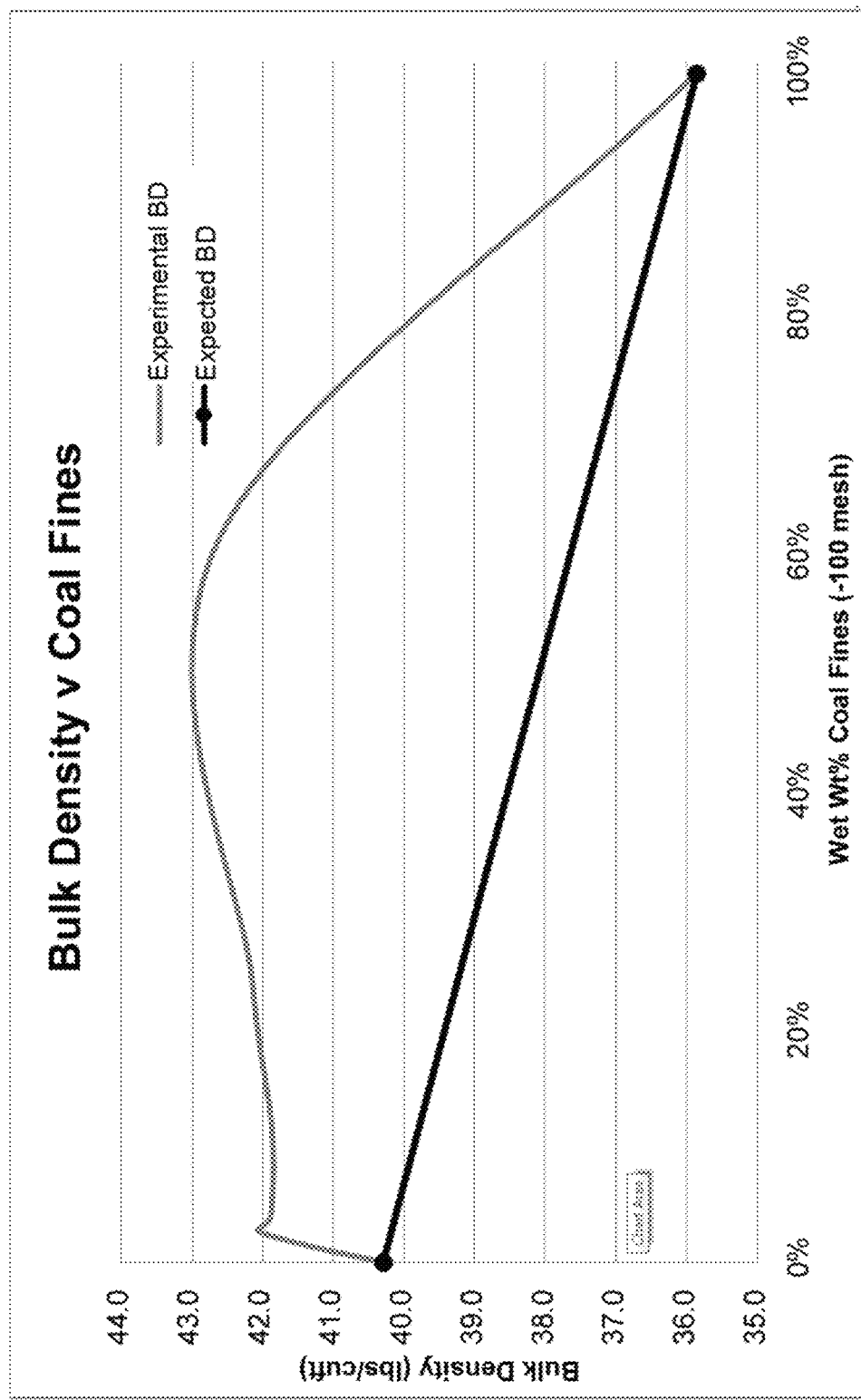
FIG. 14 depicts an exemplary bulk density plot of a mixture of coking material as the weight percent of fine coal is increased in another embodiment of the present technology.
Figure 15:
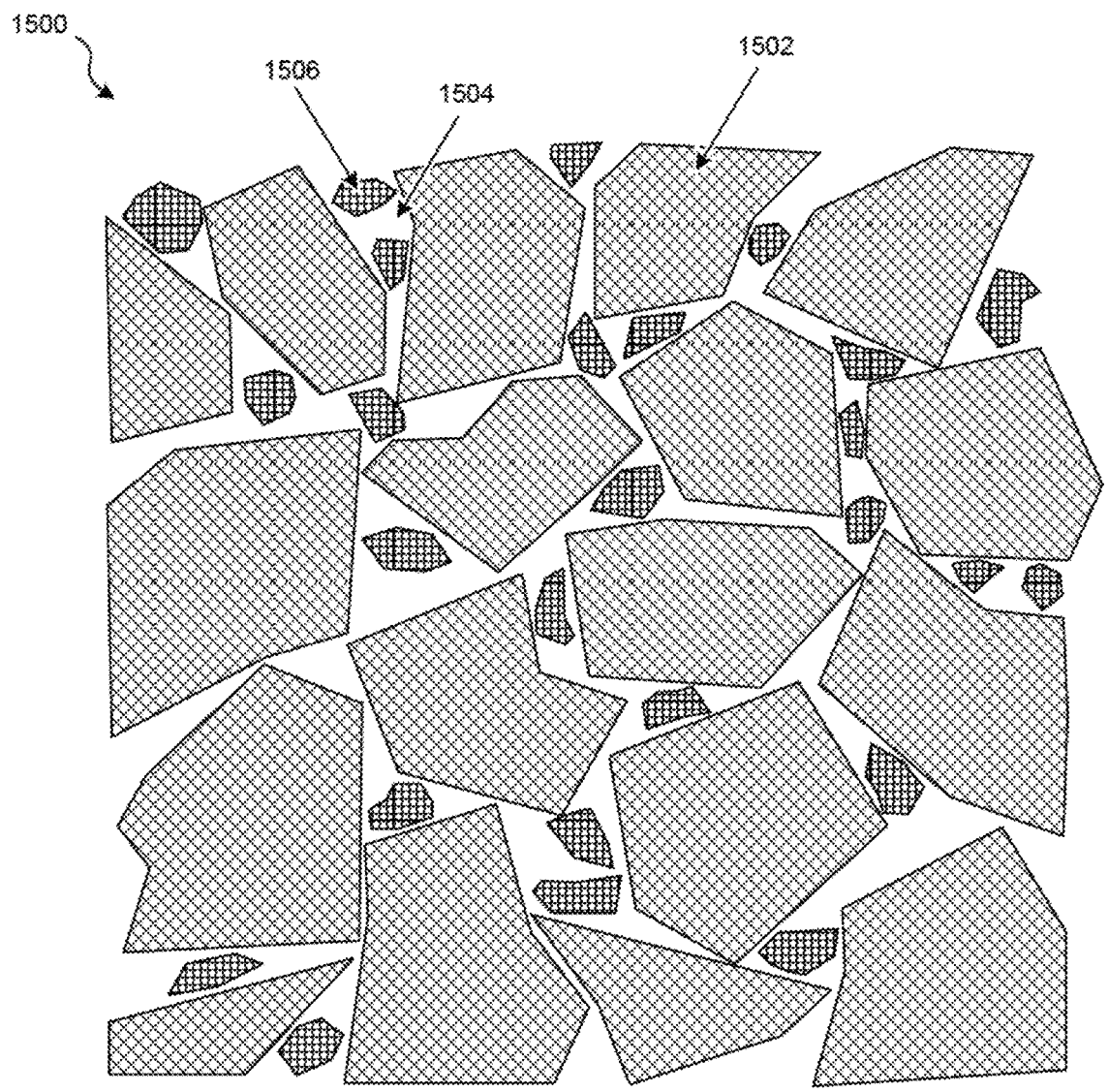
FIG. 15 depicts a partial cross-sectional view of a multi-modal bed of coking material defined by a blend of a first particulate material and a second particulate material.

The above-described process exhibits optimizing non-ideal results when a small amount of fine breeze is added to the coal. It is believed that the non-ideal characteristics peak and then diminish as more fines are added to the coal. Testing has shown that such improved density, using methods of the present technology, can be realized over the expected results of blending coal particulate with fine coal particulate. With reference to FIG. 14, the bulk density of a mixture of coking material is plotted as the weight percent of fine coal is increased. The "Experimental BD" plot depicts actual bulk density as the weight percent of fine coal is increased. The "Expected" plot depicts the expected change in bulk density under the Ideal Blending Law. In the depicted data, the bulk density of a uniform size sample of minus 100 mesh coal is approximately 36 lbs/cuft. The bulk density of a normal distribution of coal crushed to 90%-⅛ in has a bulk density of 40 lbs/cuft. However, a combination of the two samples at different proportions produced a bulk density of 43 lbs/cuft, higher than any sample alone.

Figure 16:
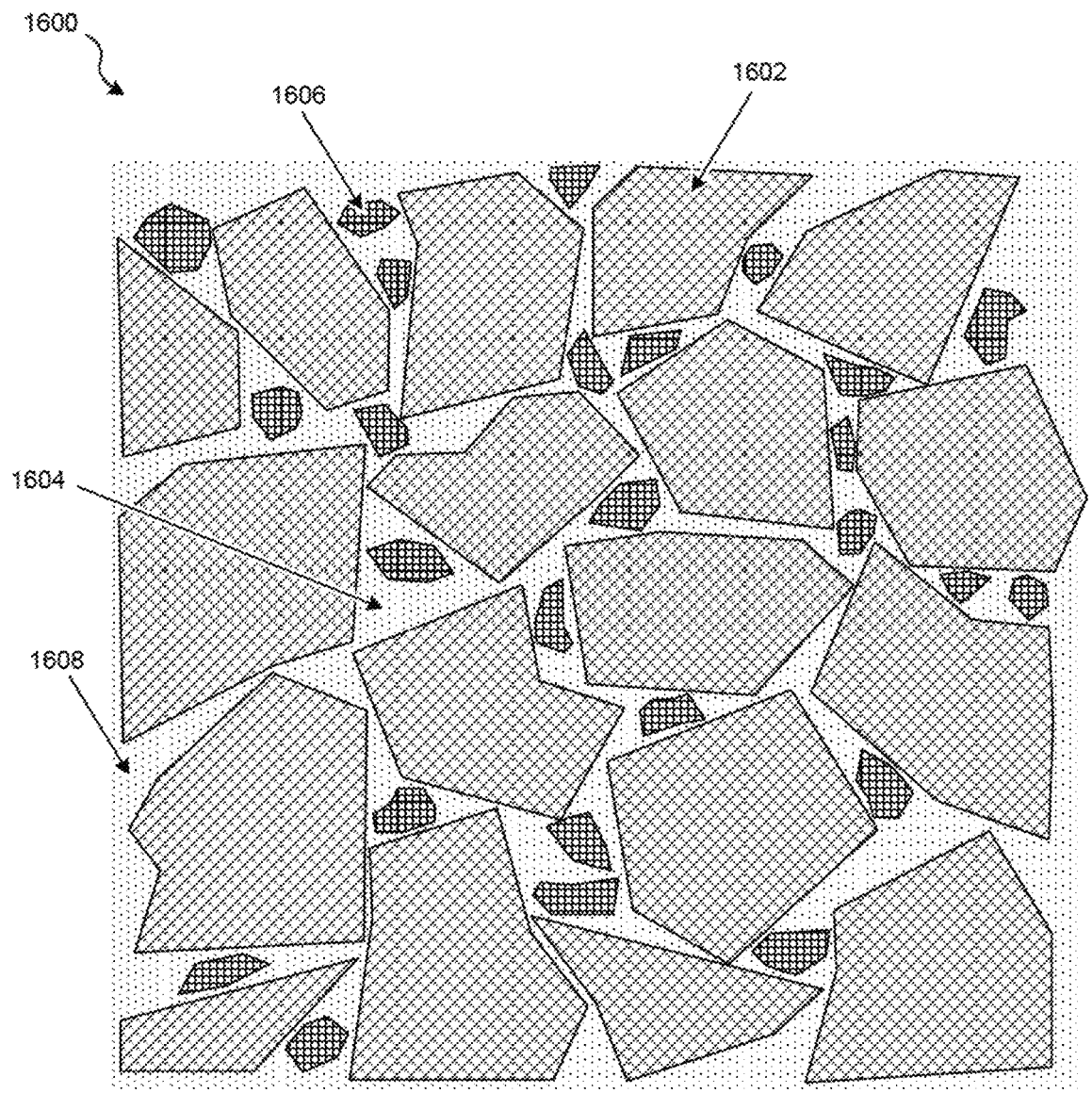
FIG. 16 depicts a partial cross-sectional view of a multi-modal bed of coking material defined by a blend of a first particulate material, a second particulate material, and a third particulate material.

Aspects of the present technology exploit the existing void spaces created by inefficiently packed particles in the naturally occurring Gaussian distribution of particles in a bulk material. As depicted in FIG. 1, the void spaces 104 are created when larger particulate materials 102 randomly orient themselves such that void spaces 104 remain between each of the larger pieces of particulate material 102. However, with reference to FIG. 15, a multi-modal bed of material 1500 is formed when a volume of a second particulate material 1506 is introduced into the Gaussian distribution and thoroughly mixed with a volume of a first particulate material 1502. Individual pieces of the second particulate material 1506 are able to occupy the void spaces 1504 generally left empty in the natural Gaussian distribution. The packing efficiency of the particulate materials increases, also increasing the bulk density. It is believed that, in certain embodiments, the multi-modal bed of material 1500 may be formed by blending three or more particulate size distributions. With reference to FIG. 16, three separate particulate size distributions are blended with one another to define the multi-modal bed of material 1600. In the depicted embodiment, a volume of a third particulate material 1608 is blended with the first particulate material 1602 and the second particulate material 1606. Individual pieces of the third particulate material 1608 are able to occupy the void spaces 1604 generally left empty in the natural Gaussian distribution between the first particulate material 1602 and the second particulate material 1606.

Using this process, an amount of material within a particular size range, can be added to a bed of loosely charged coal, increasing the density of the bed without a significant impact on the volume occupied by the coal charge. The increased density of the coal blend facilitates conductive heat transfer between individual coal particles. The additional mass of the denser bed adversely affects the coking process by adding more mass to heat. At the same time, the higher density improves the heat transfer process. Experimentation was completed on 3% higher density coal beds. The ultimate result confirmed by experimentation is that the denser bed facilitates improved conductive heat transfer sufficiently to overcome the extra time required to heat the additional bed mass. Adding the smaller particles to increase the density allowed more mass (charge) to be processed in the same amount of time. Consequently, the addition of the smaller particles increased the coking rate (coke produced/time).

Testing has demonstrated that various ratios of first particulate material to second particulate material can be blended with one another to produce variable levels of quality and density. For example, a first particulate material sized between 80%-⅛ inch to 95%-⅛ inch can be blended with a second particulate material sized between 75%-150 mesh and higher to produce a multi-modal blend. The multi-modal blend was formed using approximately 95% first particulate material and 5% second particulate material. Coke produced from such a multi-modal bed exhibited optimum quality and an acceptable density.

In another embodiment, a first particulate material sized between 75%-⅛ inch to 83%-⅛ inch was blended with a second particulate material sized between 90%-100 mesh and higher to produce a multi-modal blend. The multi-modal blend was formed using approximately 90% first particulate material and 10% second particulate material. Coke produced from such a multi-modal bed exhibited good quality and a medium density.

In yet another embodiment, a first particulate material sized between 65%-⅛ inch to 74%-⅛ inch was blended with a second particulate material sized between 75%-100 mesh and higher to produce a multi-modal blend. The multi-modal blend was formed using approximately 80% first particulate material and 20% second particulate material. Coke produced from such a multi-modal bed exhibited medium quality and good density.

In still another embodiment, a first particulate material sized between 55%-⅛ inch to 64%-⅛ inch was blended with a second particulate material sized between 50%-60 mesh and higher to produce a multi-modal blend. The multi-modal blend was formed using approximately 10% first particulate material and 90% second particulate material. Coke produced from such a multi-modal bed exhibited acceptable quality and an optimum density.

The resulting bulk density of a blend created by the present technology can be sensitive, in certain embodiments, to the moisture content of the individual materials. Moisture can cause one particulate material to adhere to another particulate material. For example, fine particles that are used to fill void spaces in a multi-modal blend adhere strongly to larger particulate material in the blend, where the larger particulate material has a greater moisture content than the fine particulate material. The attraction is strong enough to overcome the forces imposed by vibratory screeners. Table 2 below shows coal that was sieved though a vibratory screener at 9% moisture as wet coal and then again at less than 1% moisture as dry coal. The data shows that removing moisture allows more material of 50 mesh or smaller to be recovered.

Reducing the moisture content frees up the smaller particles to move around in the multi-modal bed. Accordingly, in various methods according to the present technology, the second particulate material is dried prior to blending with the first particulate material. It is contemplated that the degree to which the second particulate material is dried will vary from one embodiment to another and may be partially determined according to the type of material used and the size to which it is milled. However, in some embodiments, the second particulate material is dried to a moisture content of less than 1%, such as where the second particulate material is ground to a size that is smaller than 100 mesh. In other embodiments, the second particulate material is dried to a moisture content of less than 11%, such as where the second particulate material is ground to a size that is smaller than 30 mesh.

TABLE 2

Impact of moisture on smaller partial recovery

| Sieve Size Mesh | Wet Coal % Size | Dry Coal % Size |
| --- | --- | --- |
| 8+ | 14.44% | 13.19% |
| 16-8 | 17.02% | 13.74% |
| 30-16 | 50.18% | 15.42% |
| 50-30 | 16.95% | 19.35% |
| 100-50 | 1.33% | 19.40% |
| 200-100 | 0.08% | 11.02% |
| 200– | 0.01% | 7.88% |

The moisture differential between the first particulate material and the second particulate material plays a role in the strength of the adhesion of the particulate materials to one another. In some embodiments of the present technology, the moisture differential between the first particulate material and the second particulate material is from 3% to 14%. In other embodiments, the moisture differential is from 3% to 5%. In still other embodiments, the moisture differential is 5% or less. In one exemplary embodiment, the first particulate material is provided with a moisture content of 15% and the second particulate material is provided with a moisture content of 10%. In another exemplary embodiment, the first particulate material is provided with a moisture content of 10% and the second particulate material is provided with a moisture content of 5%. In still another exemplary embodiment, the first particulate material is provided with a moisture content of 5% and the second particulate material is provided with a moisture content of 1% or less. It is contemplated that the moisture content of either or both of the first particulate material and second particulate material may be altered to attain a desirable moisture differential. As discussed above, the particulate material can be dried, using one of various known systems and methods. However, it is contemplated that a first particulate material could be mixed with a suspension agent, prior to blending the first particulate material and second particulate material. In various embodiments, the suspension agent can include water and/or one or more fluid hydrocarbon materials, such as oil and organics such as tars, pitch, diesel, and the like.

In various aspects of the present technology, free movement of fine particles optimizes the density of the multi-modal bed. Experimentation using an embodiment of the present technology was done where the fine material was pre-conditioned to be of low moisture content. Bulk density charts above are where the fine material contained 0.1 wt % moisture. The fine material at this moisture level is free flowing. The fine particles do not appear to interact with one another or adhere to other particles in any way. The majority coal component (larger particles) was at 9% moisture. The dry fine material is then introduced into the higher moisture coal; the fine material adheres to the moister coal particles. The two materials are vigorously mixed and the blend is used to create a multi-modal coal bed that is charged to a coke oven and processed. As the blend moves from the charging system to the bed being formed, the fine particles move with the large particles and orient themselves such that the void spaces between the larger particles become occupied by the smaller particles. An added benefit of employing the dry finer particles with larger particles of higher moisture is the reduction in dust from the system. The lower moisture particles have a tendency to stick to the larger higher moisture particles. This has led to the environmental benefit of less dust production during the handling of the blends.

Higher bulk density coal beds present many benefits to the coking process. A more uniform volatile matter release rate throughout the coking cycle is caused by the denser bed which prevents the volatile matter from easily escaping early in the coking cycle. In heat-recovery ovens, this can translate to a lower peak temperature which is detrimental to the oven bricks. The slower volatile matter release results in a higher oven operating temperature later in the coking cycle, which is when the heat is generally needed the most. Methods, such as flue gas sharing, have been developed to mitigate the slow volatile matter release at the end of the coking cycle. In contrast, the extremely high density attained by various methods of mechanical stamp chargers can inhibit the release of the volatile matter.

Multi-modal beds have also shown the ability to improve coking time of a bed charged to the oven. The higher density bed also allows more material to be charged in the same volume resulting in an increased coking rate. The denser bed also facilitates conductive heat transfer. However, unlike stamp charging methods of obtaining density, multi-modal beds of the present technology still include loosely packed coal. This allows the coal to release the volatile matter much easier than the super packed stamp charged beds. The heat up of the heat-recovery ovens is faster than stamp charge units. The plastic layer progresses faster through the bed in both heat-recovery ovens and by-product ovens due to the loosely packed high density bed. In experimentation, a heat-recovery coke oven that normally processed 48 tons of coal was able to process 49.5 tons of coal and fine breeze (3 wt. %) during the same 48 hour period. A coking rate improvement of 1% to 10% above the coal beds using a Gaussian partial size distribution is expected by using multi-modal beds of the present technology.

The density improvement acquired by multi-modal blends of the present technology has many other advantages. The addition of a suspension agent, such as oil, may be used to improve the flowability of coal particle and it ultimately improves the packing efficiency and density of the coal beds created. Multi-modal blends of the present technology, without oil addition, exhibited improved flowability characteristics in all experiments, compared with standard coal mixtures. Multi-modal blends created by the present technology introduce dry fine material to larger coal particles, which also enhance flowability of the coal by providing a flexible layer of smaller particles between the larger coal particles. Adding oil to a multi-modal bed further enhances benefits derived from each method individually.

The improved flowability exhibited by the present technology is expected to provide a number of advantages for the coking process. The coal charge occupies a more uniform space in the coking oven. In a traditional heat-recovery oven, the coal charge has void volumes along the wall. The charge height at the coke side of the oven is lower than the charge height at the coal side of the oven due to the flex in the charging conveyer. A more level charge of the coal bed from the center of the oven to the wall, and from the front door to the back door, uses more of the available oven volume.

A uniform bed height has additional advantages. In current pushing practices, the height difference between the pusher side and coke side of a heat recovery oven is suspected as causing a higher temperature on one side. A level oven charge is expected to promote a more consistent temperature profile across a heat-recovery oven from the coke side to the pusher side because the volume of coal at each side is identical. Additionally, a level charge provides the opportunity to slightly increase the charge weight to each oven occupying volume that was normally void along the walls and the coke side door. Coking material effectively uses the wasted oven volume to produce coke. The higher density of the coal bed compounds on the flowability benefits. A similar oven filling benefit can be realized in by-product ovens due to the improved flowability exhibited by the present technology.

Ultrahigh density coal beds can be achieved by stamp charging multi-modal blends of the present technology. Generally, a stamp charging process can increase bed density by 10% or more but requires 10% or more moisture in the coal bed to keep the bed from falling apart when placed in the oven. A multi-modal blend is created, according to the present technology, using a dry fine material which effectively reduces the overall moisture content of the bed. As discussed previously, multi-modal beds of the present technology exhibit improved flowability characteristics as well. Stamp charging a multi-modal bed results in a ultrahigh density, low moisture bed of coking material. This translates to less heat used to remove the moisture from the coal charge, faster heat-up, and reduced coking time.

Multi-modal beds can be used to further enhance the density improvement achieved from stamp charging. Stamp charging works by mechanically forcing particles to re-orient themselves and compact against neighboring particles removing void spaces and improving the packing efficiency of the bed. Some of the current compaction methods employed include hammers, hydraulic presses and vibro-compactors. Multi-modal beds, according to the present technology, also exhibit improved packing efficiency and reduced void spaces. They also have less moisture and improved flowability. Stamp charging a multi-modal bed further increases the density of the multi-modal bed. In some embodiments, stamp charging a multi-modal bed increases the density of the multi-modal bed from between 0.67 sg to 0.78 sg to a density of between 0.85 sg to 1.2 sg. In other embodiments, the multi-modal bed of material is stamp charged to a density of over 1.2 sg. Stamp charging a multi-modal bed of material requires less effort than stamp charging a standard bed of material due to the improved flowability of the multi-modal bed of material. This ultimately reduces the passes required by stamp charging, reduces the size of the equipment used in stamp charging, reduces the pressure used in stamp charging, and reduces the cycle time required to stamp charge. In an optimized state, multi-modal blends can serve as a substitute for stamp charging. Multi-modal blends of the present technology realize an increased density, which leads to higher quality coke and higher coke production rates.

The higher density charges realized by the present technology result in higher CSR. This principal is used when low grade coals are stamp charged to enhance the coke CSR. Multi-modal beds exhibiting higher density achieve the same result on CSR due to the higher density. The CSR improvement is believed to be related to denser less porous coke produced by the dense charge.

Figure 17:
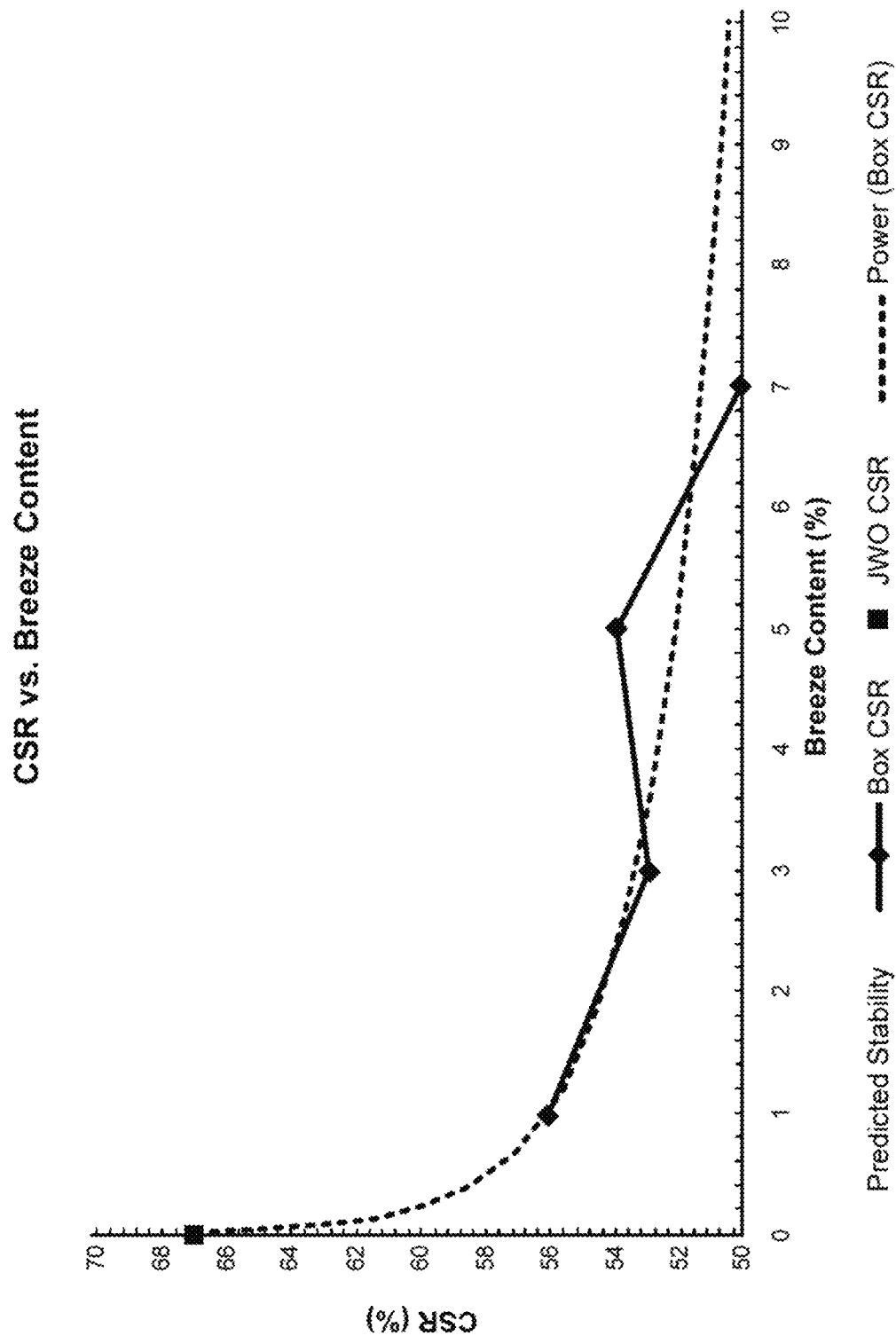
FIG. 17 depicts experimental results of one embodiment of the present technology where coarse breeze was introduced to a known coal blend and the resulting CSR decreased as the breeze content increased.

Multi-modal beds of high density can be used to correct detrimental impact of components in the coal blend. Breeze, generally a waste material, can be blended into the coal to enhance its value by transforming it into coke. However, breeze has a very high ash content, ranging between 12% to 35% ash. Ash is detrimental to CSR. Experimental results have shown that CSR decreases as breeze is added to a coal blend. FIG. 17 depicts experimental results where coarse breeze was introduced to a known coal blend and the resulting CSR decreased as the breeze content increased.

Multi-modal beds, according to the present technology, can be used to correct for the drop in CSR. In some embodiments, the breeze can be milled to a fine size and used to create a multi-modal blend in small proportions. The high ash content of the breeze will decrease the CSR of the final product. However, the fine breeze increases the bed density increasing the CSR of the final product countering the impact from the ash. The end result is that the CSR of the final product remains unchanged while breeze is successfully introduced into the coal blend.

Another advantage attained by the use of finer breeze is increased strength. When the above test employed a finer grind, the CSR loss per percent breeze added decreased. This occurs because large breeze can actually be a crack initiator. It is believed that if the breeze is larger than the coke pore cell wall thickness, it will cause cracks and breakage. If the breeze is smaller than the cell wall, it will actually stop cracks and breakage by relieving stress.

Figure 18:
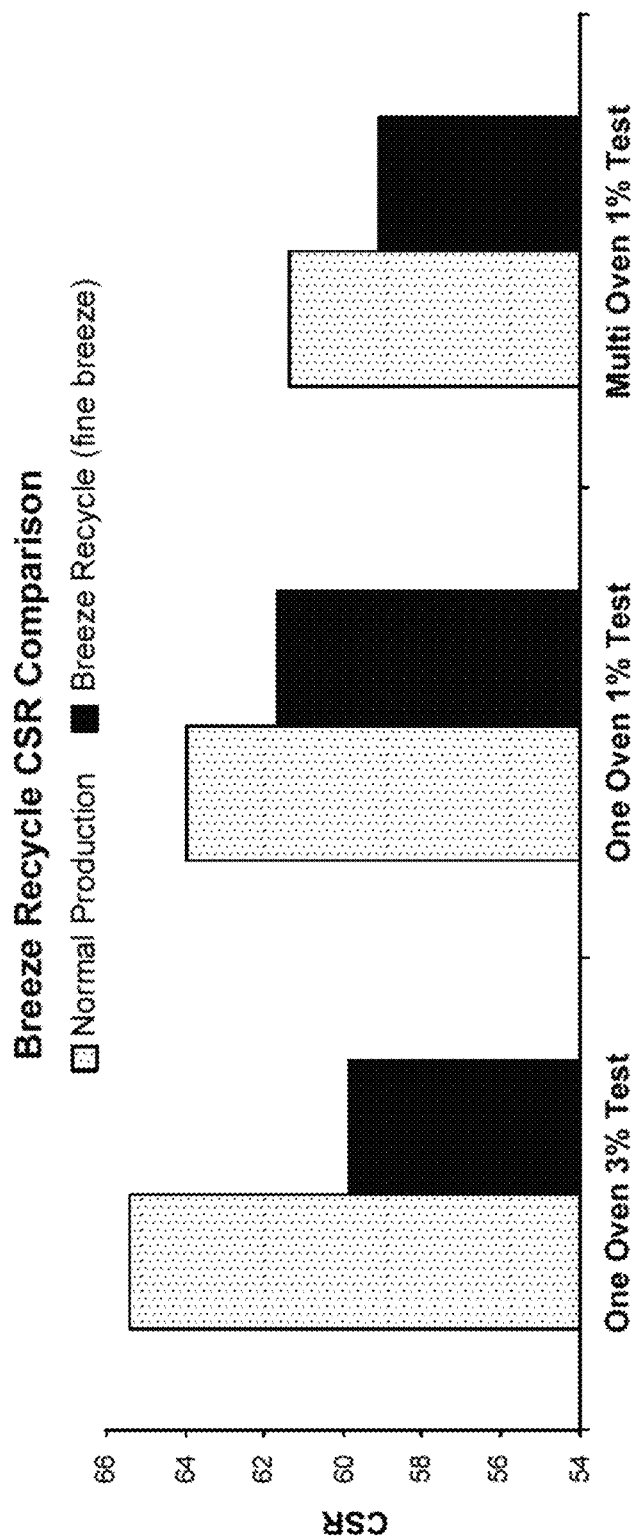
FIG. 18 depicts experimental results of one embodiment of the present technology where a marginal decrease in CSR was experienced as breeze was introduced into the coal blend.

Experimental results confirm the mitigation effect of multi-modal beds. FIG. 18 depicts a marginal decrease in CSR as breeze is introduced into the coal blend. Note the substantial difference between the impact of breeze in FIG. 17 and FIG. 18. The compensation by multi-modal blending makes it possible to overcome the severe CSR impact of ash on the product coke to generate a commercially acceptable product.

Bed height is also linked to bed density. A taller bed exerts more static pressure on the coal at the bottom of the bed creating a compact, dense region at the bottom. This region generally produces higher CSR coke. To optimize the production capacity of ovens, a thinner bed can be charged. A thinner bed cokes faster than a thicker bed when compared on a tons of coal processed/hour basis. The reason is that the heating rate is non-linear and the heating rate is faster for thinner beds. Because the distance between the top and bottom of the bed is less, it takes less time for the plastic layer to propagate through the bed and complete the coking cycle. This allows a coke oven annual capacity to increase by 25% or more on an annual basis. As an example, a heat-recovery oven can process 48 tons in 48 hours or 28 tons in 24 hours. However, the thinner beds have less static pressure on the bottom and result in lower CSR coke product. Multi-modal beds, according to the present technology, can be used to compensate the thinner beds by boosting the density of the thinner bed and ultimately the CSR. As such, multi-modal beds can overcome or immunize against the detriment to CSR commonly realized in a thinner bed, producing coke of a quality comparable to that attained by coking charges having traditional bed heights.

Multi-modal beds, of the present technology, also realize higher stability coke. This can be attributed to the fact that the fine particles, especially those with dissimilar properties than coal (inerts) become engrained in the coke structure as the plastic layer passes across that section of the bed. The coke without the fine material is similar to cement. The coke with the fine material ingrained into the structure is similar to concrete with an aggregate material providing strength to the overall structure. Petrographic results confirm that materials that are dissimilar to coal, such as breeze, are incorporated into the coke structure in the coking process.

Figure 19:
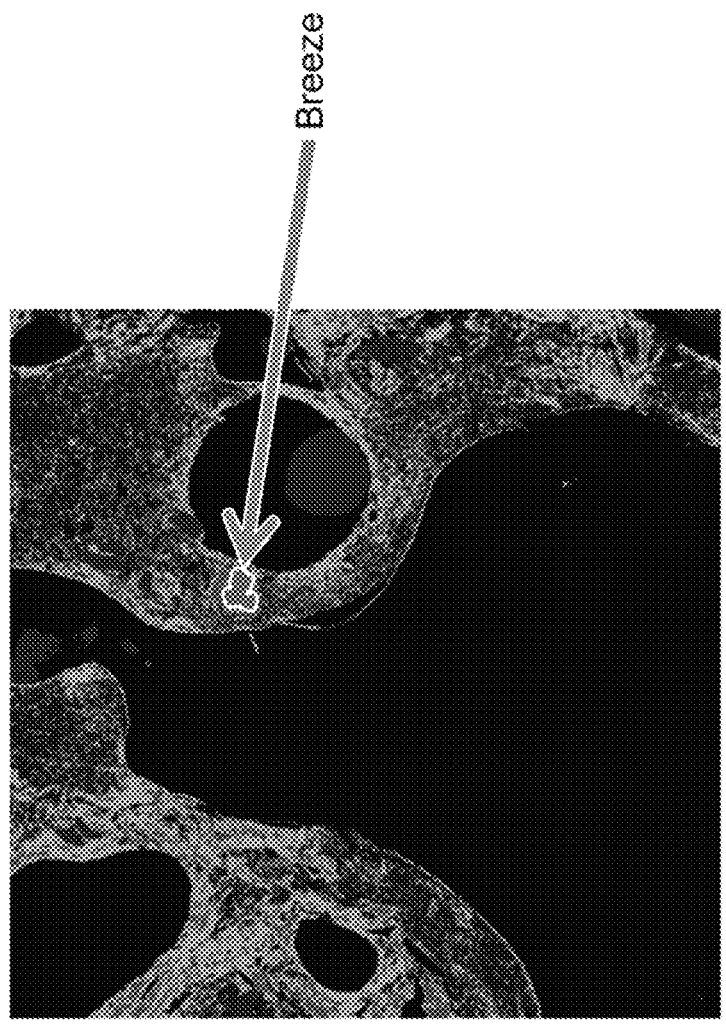
FIG. 19 depicts the integration of a portion of second particulate material into the structure of a portion of first particulate material in one embodiment of the present technology.
Figure 20:
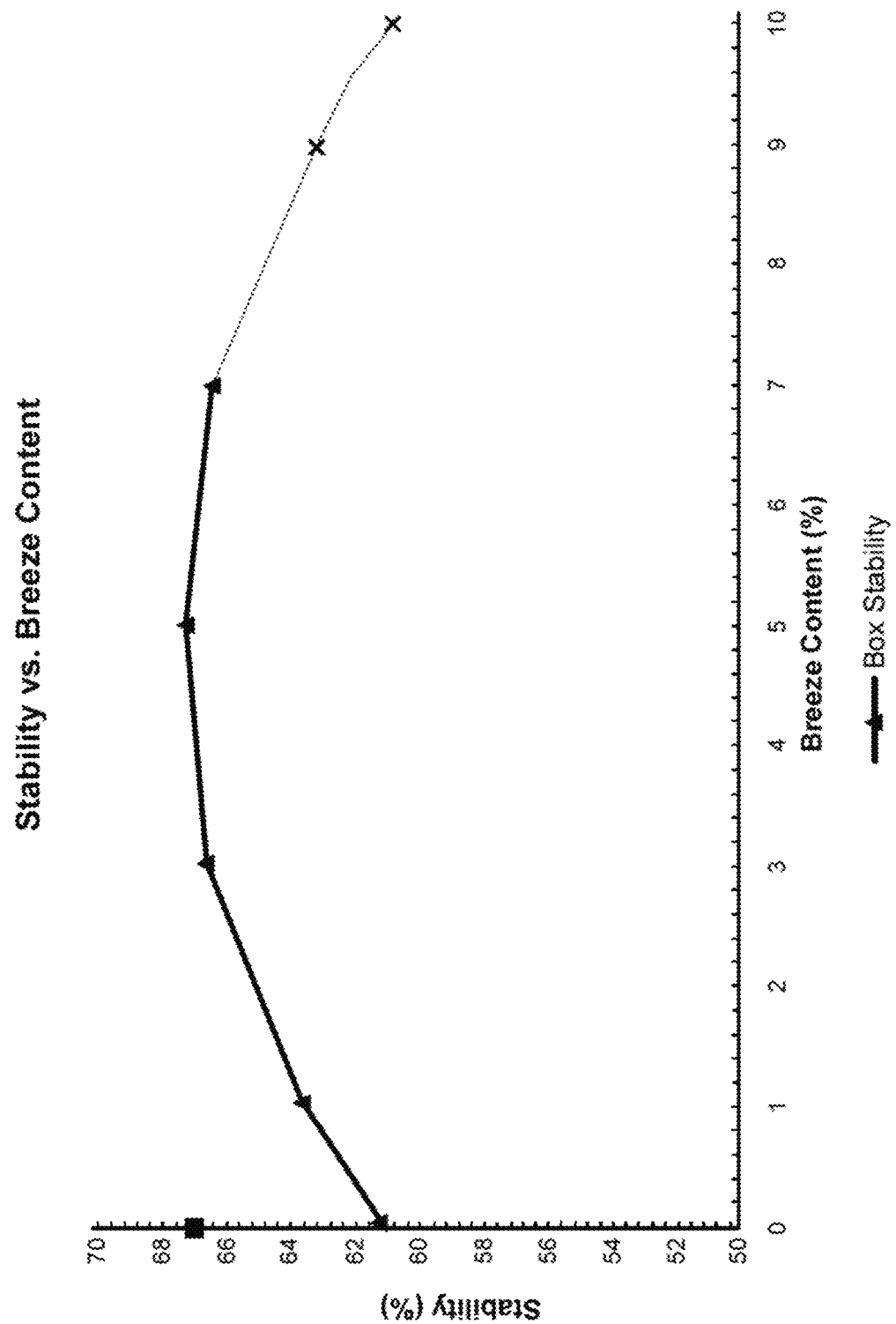
FIG. 20 depicts a plot of stability as a function of breeze content in one embodiment of the present technology.

A fracture starting at the outer end of the coke structure, as depicted in FIG. 19, will propagate until it intersects the aggregate particle. At this point, the crack stops propagation because of the dissimilar material. In the absence of the aggregate material, fine breeze, in this case, the crack would propagate through the entire structure breaking the coke piece and reducing its performance in a stability test. Experimental results confirm the increase in stability with the introduction of fine inert material. FIG. 20 demonstrates the stability increase with breeze content. Moreover, integration of fines, such as breeze, into the coke structure and higher stability will result in the consumption of breeze or fines and generation of less breeze by the product coke. This results in the net reduction of breeze generation from a coke plant when multi-modal blends are used. The increase in stability further enables a top cut of coke that is 4" and greater in size, amounting to approximately 5% to 10% of the coked multi-modal bed. The larger coke produced in this manner may be used in foundry coke operations.

Figure 21:
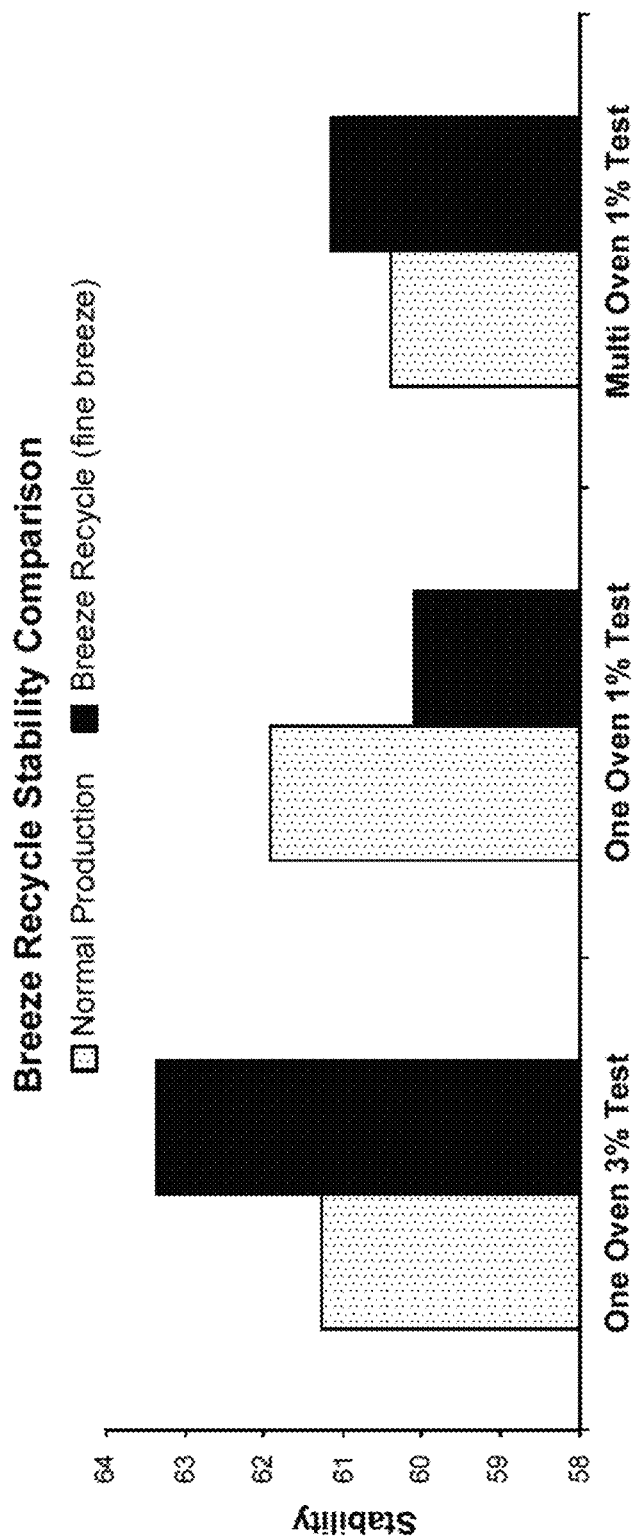
FIG. 21 depicts test data from an embodiment of the present technology demonstrating that stability generally increases with the introduction of breeze.

Multi-modal blends can be used to enhance stability to compensate for other factors that are detrimental to stability. As discussed above, thinner beds can be used to improve coke oven production. However, in addition to a detriment to CSR, thinner beds also result in a detriment to stability in the final product. Multi-modal thin beds, according to the present technology, compensate for this effect, creating a higher stability thin bed product. Ultimately, this results in a high capacity coke oven capable of producing a commercially acceptable product. FIG. 21 depicts that stability generally increases with the introduction of breeze (multi-modal beds). The oven 1% test was run at a cooler temperature, which has a substantial impact on stability. However, the multi-modal bed compensated this effect and the end impact on stability was minimized.

The benefits of multi-modal beds discussed above can further be utilized incorporating new materials. Low grade coal, anthracite, bio-char, and other carbon containing compounds can be incorporated into the coal blend. Further, using a breeze-coal multi-modal blend will reduce the total effective VM composition of the coal blend because breeze contains very little VM and has 100% yield to coke while coal has 100-VM yield to coke. A higher VM coal can be used to compensate for the low VM breeze. The VM release rate is also lower due to the increased bulk density of the bed. The higher VM coals will release VM slower than under a condition with lower bulk density. This will lower the initial peak temperature of the oven ultimately making high VM, lower cost coals a practical ingredient in the coking process.

Multi-modal beds, according to the present technology, can also result in a high yield in the coking process. The resulting coke is more stable and produces less breeze. Also, fine ingredients used, such as breeze, can have little to no VM and the majority of the material will be converted into coke.

EXAMPLES

The following Examples are illustrative of several embodiments of the present technology.

1. A method of coking beds of material, the method comprising:
   processing a first bed of carbon-containing material in a coking oven to produce a first volume of coke and a first volume of waste material; and
   processing a second bed of carbon-containing material, comprising the first volume of waste material, in the coking oven to produce a second volume of coke and a second volume of waste material; the second volume of waste material being smaller than the first volume of material.

2. The method of example 1 wherein the coking oven is a horizontal heat recovery oven.

3. The method of example 1 wherein the first volume of waste material is an inert carbon material.

4. The method of example 1 wherein the first volume of waste material is an inert non-carbon-material.

5. The method of example 1 wherein the first volume of waste material is comprised of breeze.

6. The method of example 1 wherein the first volume of waste material is comprised of clinker.

7. The method of example 1 wherein the second bed of carbon-containing material is comprised of a quantity of particulate coking material having a first particulate size; the first volume of waste material having a second particulate size, which is smaller than the first particulate size; the particulate coking material being combined with the first volume of waste material to define the second bed of carbon-containing material as a multi-modal bed of material.

8. The method of example 7 further comprising:
   milling the first volume of waste material to the second particulate size prior to combining the quantity of particulate coking material with the first volume of waste material to define the multi-modal bed of material.

9. The method of example 7 further comprising:
   adding a suspension agent to the quantity of particulate coking material prior to combining the quantity of particulate coking material with the first volume of waste material to define the multi-modal bed of material.

10. The method of example 9 wherein the suspension agent is comprised of a fluid hydrocarbon.

11. The method of example 10 wherein the suspension agent is comprised of at least one of oil, tar, pitch and diesel.

12. The method of example 9 wherein the quantity of particulate coking material has a first moisture content, the first volume of waste material has a second moisture content, and the difference between the first moisture content and the second moisture content is from 3% to 14%.

13. The method of example 1 wherein the quantity of first volume of waste material approximates less than 5% by weight of the second bed of carbon-containing material.

14. The method of example 1 wherein the second bed of carbon-containing material is comprised of a quantity of particulate coking material having a first bulk density and the first volume of waste material has a second bulk density; the second bed of carbon-containing material having a third bulk density which is higher than the first bulk density and the second bulk density.

15. The method of example 1 wherein the first bed of carbon-containing material experiences a first volatile material loss during processing and the second bed of carbon-containing material experiences a second volatile material loss which is lower than the first volatile material loss.

16. The method of example 1 wherein the first volume of coke amounts to a first percentage of the first bed of carbon-containing material and the second volume of coke amounts to a second percentage of the second bed of carbon-containing material; the second percentage being higher than the second percentage.

17. A method of coking beds of material, the method comprising:
   providing a quantity of carbon-containing coking material;
   providing a quantity of process waste material;
   combining the quantity of carbon-containing coking material with the quantity of process waste material to define a multi-modal bed of material; and processing the multi-modal bed of material in a coking oven.

18. The method of example 17 wherein:
   the quantity of carbon-containing coking material has a first particulate size; and the quantity of process waste material has a second particulate size, wherein the second particulate size is smaller than the first particulate size.

19. The method of example 17 further comprising:
   milling the quantity of process waste material to the second particulate size prior to combining the quantity of carbon-containing coking material with the quantity of process waste material to define the multi-modal bed of material.

20. The method of example 17 wherein the quantity of carbon-containing material has a first bulk density, the quantity of process waste material has a second bulk density, and the multi-modal bed of material has a third bulk density which is higher than the first bulk density and the second bulk density.

21. The method of example 17 wherein the quantity of carbon-containing coking material has a first moisture content, the quantity of process waste material has a second moisture content, and the difference between the first moisture content and the second moisture content is from 3% to 14%.

22. The method of example 17 wherein the quantity of quantity of process waste material approximates less than 5% by weight of the multi-modal bed of material.

23. The method of example 17 wherein the quantity of coking process waste material is chosen from a group of materials including: breeze; clinker; biochar; recycled refractory material; coke; coal; pad coke; pad coal; bag house dust; fly ash; lime; activated carbon; and quench pond dripping.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Further, certain aspects of the new technology described in the context of particular embodiments may be combined or eliminated in other embodiments. Moreover, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:

1. A method of coking beds of material, the method comprising:
   processing a first bed of carbon-containing material in a coking oven to produce a first volume of coke and a first volume of waste material; and
   preparing a second bed of carbon-containing material, comprising a quantity of particulate coking material, having a first particulate size and a first moisture content, and the first volume of waste material, having a second particulate size that is smaller than the first particulate size and a second moisture content; a moisture content differential existing between the first moisture content and the second moisture content that increases an adhesion strength between the particulate coking material and first volume of waste material; the particulate coking material being combined with the first volume of waste material, such that the particulate coking material is distributed in a manner that defines a plurality of void spaces between individual particulates within the particulate coking material and the voids are at least partially filled with the first volume of waste material, to define the second bed of carbon-containing material as a multi-modal bed of material having a generally uniform distribution of particulate coking material and first volume of waste material from a bottom portion of the second bed of carbon-containing material to an upper portion of the second bed of carbon containing coking material, wherein the first volume of waste material approximates less than 10% by weight of the multi-modal bed of material;
   processing the second bed of carbon-containing material in the coking oven to produce a second volume of coke and a second volume of waste material; the second volume of waste material being smaller than the first volume of waste material.

2. The method of claim 1 wherein the coking oven is a horizontal heat recovery oven.

3. The method of claim 1 wherein the first volume of waste material is an inert carbon material.

4. The method of claim 1 wherein the first volume of waste material is an inert non-carbon-material.

5. The method of claim 1 wherein the first volume of waste material is comprised of breeze.

6. The method of claim 1 wherein the first volume of waste material is comprised of clinker.

7. The method of claim 1 further comprising:
   milling the first volume of waste material to the second particulate size prior to combining the quantity of particulate coking material with the first volume of waste material to define the multi-modal bed of material.

8. The method of claim 1 further comprising:
   adding a suspension agent to the quantity of particulate coking material prior to combining the quantity of particulate coking material with the first volume of waste material to define the multi-modal bed of material.

9. The method of claim 8 wherein the suspension agent is comprised of a fluid hydrocarbon.

10. The method of claim 9 wherein the suspension agent is comprised of at least one of oil, tar, pitch and diesel.

11. The method of claim 8 wherein the quantity of particulate coking material has a first moisture content, the first volume of waste material has a second moisture content, and the difference between the first moisture content and the second moisture content is from 3% to 14%.

12. The method of claim 1 wherein the quantity of first volume of waste material approximates less than 5% by weight of the second bed of carbon-containing material.

13. The method of claim 1 wherein the second bed of carbon-containing material is comprised of a quantity of particulate coking material having a first bulk density and the first volume of waste material has a second bulk density; the second bed of carbon-containing material having a third bulk density which is higher than a weighted average of the first bulk density and the second bulk density under an Ideal Blending Rule.

14. The method of claim 1 wherein the first bed of carbon-containing material experiences a first volatile material loss during processing and the second bed of carbon-containing material experiences a second volatile material loss which is lower than the first volatile material loss.

15. The method of claim 1 wherein the first volume of coke amounts to a first percentage of the first bed of carbon-containing material and the second volume of coke amounts to a second percentage of the second bed of carbon-containing material; the second percentage being higher than the first percentage.

16. A method of coking beds of material, the method comprising:
   providing a quantity of carbon-containing coking material having a first particulate size;
   providing a quantity of non-breeze process waste material having a second particulate size, wherein the second particulate size is smaller than the first particulate size, wherein the quantity of non-breeze process waste material is chosen from a group of materials including: clinker; biochar; recycled refractory material; bag house dust; fly ash; lime; activated carbon; and quench pond dipping;
   combining the quantity of carbon-containing coking material with the quantity of process waste material, such that the carbon-containing coking material is distributed in a manner that defines a plurality of void spaces between individual particulates within the carbon-containing coking material and the voids are at least partially filled with the process waste material, to define a multi-modal bed of material having a generally uniform distribution of carbon-containing coking material and quantity of process waste material from a bottom portion of the multi-modal bed of material to an upper portion of the multi-modal bed of material; and
processing the multi-modal bed of material in a coking oven.

17. The method of claim 16 further comprising:
milling the quantity of process waste material to the second particulate size prior to combining the quantity of carbon-containing coking material with the quantity of process waste material to define the multi-modal bed of material.

18. The method of claim 16 wherein the quantity of carbon-containing material has a first bulk density, the quantity of process waste material has a second bulk density, and the multi-modal bed of material has a third bulk density which is higher than the first bulk density and the second bulk density.

19. The method of claim 16 wherein the quantity of carbon-containing coking material has a first moisture content, the quantity of process waste material has a second moisture content, and the difference between the first moisture content and the second moisture content is from 3% to 14%.

20. The method of claim 16 wherein the quantity of process waste material approximates less than 5% by weight of the multi-modal bed of material.

* * * * *

UNITED STATES PATENT AND TRADEMARK OFFICE
CERTIFICATE OF CORRECTION

PATENT NO. : 10,968,395 B2
APPLICATION NO. : 14/983837
DATED : April 6, 2021
INVENTOR(S) : John Francis Quanci et al.

It is certified that error appears in the above-identified patent and that said Letters Patent is hereby corrected as shown below:

On the Title Page

In page 6, Column 1, Line 52, delete "Internatinoal" and insert --International-- therefor.

In page 6, Column 2, Line 66, delete "Apr. 101, 2020," and insert --Apr. 10, 2020,-- therefor.

In the Specification

In Column 8, Line 36, delete "$\rho \geq \rho A *\chi A + \rho B *\chi B + \ldots + \chi\eta$" and insert
--$\rho > \rho A * \chi A + \rho B * \chi B + \ldots + \chi\eta$-- therefor.

In Column 12, Line 6, delete "0.96*41.17+0.01+40.75-41.41 lbs/cuft." and insert
--$0.96 * 41.17 + 0.04 * 48.75 = 41.47 lbs/cuft$-- therefor.

In Column 20, Line 23, after "and", insert --¶--.

In Column 20, Line 27, after "and", insert --¶--.

Signed and Sealed this
Fourteenth Day of June, 2022

Katherine Kelly Vidal
*Director of the United States Patent and Trademark Office*